(12) United States Patent
Cheng et al.

(10) Patent No.: US 11,422,561 B2
(45) Date of Patent: Aug. 23, 2022

(54) SENSOR SYSTEM FOR MULTIPLE PERSPECTIVE SENSOR DATA SETS

(71) Applicant: TOYOTA JIDOSHA KABUSHIKI KAISHA, Toyota (JP)

(72) Inventors: Bin Cheng, Mountain View, CA (US); Gaurav Bansal, Mountain View, CA (US); Ryan Matthew Yee, Mountain View, CA (US); Ellick Ming Huen Chan, Mountain View, CA (US); Carmine Senatore, Mountain View, CA (US)

( * ) Notice: Subject to any disclaimer, the term of this patent is extended or adjusted under 35 U.S.C. 154(b) by 126 days.

(21) Appl. No.: 15/997,750

(22) Filed: Jun. 5, 2018

(65) Prior Publication Data

US 2019/0212746 A1 Jul. 11, 2019

Related U.S. Application Data

(60) Provisional application No. 62/616,294, filed on Jan. 11, 2018.

(51) Int. Cl.
*G05D 1/02* (2020.01)
*G01K 3/14* (2006.01)
(Continued)

(52) U.S. Cl.
CPC ............ *G05D 1/0212* (2013.01); *G01K 3/14* (2013.01); *G01V 9/005* (2013.01); *G05D 1/0088* (2013.01);
(Continued)

(58) Field of Classification Search
CPC .. G05D 1/0212; G05D 1/0274; G05D 1/0088; G05D 2201/0213; G01K 3/14; G01V 9/005
See application file for complete search history.

(56) References Cited

U.S. PATENT DOCUMENTS 5,040,116 A * 8/1991 Evans, Jr. ............. G01S 17/931
                                                   701/28
9,612,123 B1 * 4/2017 Levinson ............... B60Q 1/525
(Continued)

FOREIGN PATENT DOCUMENTS

JP       PO2011-162132      8/2011
WO    WO-2018132608 A2 *  7/2018  ...... B60W 30/18163

*Primary Examiner* — Thomas Ingram
*Assistant Examiner* — Omar K Morsy
(74) *Attorney, Agent, or Firm* — Burbage Law, P.C.; Jon-Michael Burbage

(57) ABSTRACT

The disclosure includes embodiments for a sensor system for multiple perspective sensor data sets. In some embodiments, a method executed by an ego vehicle includes receiving, from a set of remote vehicles, a set of sensor data describing a set of preliminary heatmaps for a roadway environment. The method includes reconciling discrepancies in the set of heatmaps and a preliminary heatmap of the ego vehicle to form a combined heatmap that describes the objects in the roadway environment as collectively observed by the onboard sensors of the set of remote vehicles and the ego vehicle. The method includes providing the combined heatmap to one or more of the remote vehicles included in the set of remote vehicles. The method includes modifying an operation of the ego vehicle based on the combined heatmap. For example, an operation of an autonomous driving system of the ego vehicle is modified.

20 Claims, 14 Drawing Sheets

(51) Int. Cl.
*G05D 1/00* (2006.01)
*G01V 9/00* (2006.01)
(52) U.S. Cl.
CPC ... *G05D 1/0274* (2013.01); *G05D 2201/0213* (2013.01)

(56) References Cited

U.S. PATENT DOCUMENTS

| | | | | |
|---|---|---|---|---|
| 9,734,455 | B2* | 8/2017 | Levinson | G05D 1/0246 |
| 2016/0252903 | A1* | 9/2016 | Prokhorov | B60W 40/02 |
| | | | | 701/23 |
| 2017/0316333 | A1* | 11/2017 | Levinson | G06K 9/00 |
| 2018/0326994 | A1* | 11/2018 | Sakai | G05D 1/0061 |
| 2018/0338250 | A1* | 11/2018 | Mishra | H04W 24/10 |
| 2019/0164319 | A1* | 5/2019 | Callender | H04W 4/00 |

* cited by examiner

SENSOR SYSTEM FOR MULTIPLE PERSPECTIVE SENSOR DATA SETS

This application claims priority to U.S. Provisional Patent Application 62/616,294 filed Jan. 11, 2018 and entitled "Sensor System," the entirety of which is hereby incorporated by reference in its entirety.

BACKGROUND

The specification relates to a sensor system for multiple perspective sensor data sets. In some embodiments, the specification relates to an automated vehicle that includes an onboard vehicle computer system that includes the sensor system and the multiple perspective sensor data sets that are operable to modify the operation of the automated vehicle.

Automated vehicles are becoming increasingly popular. An automated vehicle is a vehicle that includes an automated driving system. The automated driving system provides autonomous functionality that renders the vehicle an automated driving system. Currently, automated driving systems primarily perceive scenes in their environment from a single perspective (i.e., the perspective of their own onboard sensors); as a result, these vehicles are unable to leverage additional information about scenes from the viewpoint of other vehicles in their environment using vehicle-to-vehicle (V2V), vehicle-to-anything (V2X), or other intervehicle communication technologies (e.g. 5G, LTE, etc.). These existing solutions at most can perceive their environment primarily from a single point of view (e.g., a single vehicle's perspective) and cannot effectively reconcile information from multiple viewpoints (e.g., the perspective of multiple vehicles) shared by other vehicles. As a result, the existing automated driving systems make poorer driving decisions due to incomplete, inaccurate, or indeterminate scene information which leads to increased accidents, collisions, and fatalities.

SUMMARY

An automated vehicle is a vehicle that includes set of Advanced Driver Assistance Systems ("ADAS system" if singular, or "ADAS systems" if plural) that provide sufficient automated vehicle functionality to render the vehicle an automated vehicle. This set of ADAS systems may be referred to as an automated driving system.

Currently, automated driving systems primarily perceive scenes in their environment from a single perspective (i.e., the perspective of their own onboard sensors); as a result, these vehicles are unable to leverage additional information about scenes from the viewpoint of other vehicles in their environment using V2V, V2X, or other intervehicle communication technologies (e.g. 5G, LTE, etc.). These existing solutions at most can perceive their environment primarily from a single point of view (e.g., a single vehicle's perspective) and cannot effectively reconcile information from multiple viewpoints (e.g., the perspective of multiple vehicles) shared by other vehicles. As a result, the existing automated driving systems make poorer driving decisions due to incomplete, inaccurate, or indeterminate scene information which leads to increased accidents, collisions, and fatalities.

Described herein are embodiments of a sensor system included on an onboard vehicle computer of an automated vehicle that improves the sensor-based perception capabilities of an automated vehicle. In some embodiments, the automated vehicle is a connected vehicle that includes wireless communication capability. In some embodiments, the sensor system generates digital data that describes one or more of the following: sensor measurements; objects that are indicated by the sensor measurements; type classifications for these detected objects (e.g., car, road, bicycle, pedestrian, etc.); and confidence values in the type classifications. In some embodiments, the sensor system wirelessly shares the digital data with other automated vehicles via a wireless network. For example, the sensor system is operable to wirelessly share the digital data with other automated vehicles via V2V, V2X, or other intervehicle communication technologies (e.g. 5G, LTE, etc.). In some embodiments, the wireless messages that include this digital data are relayed by a first automated vehicle to a second automated vehicle using vehicle-to-infrastructure (V2I) technologies using a roadside unit (RSU) or some other connected infrastructure device as a relay point between the first automated vehicle and the second automated vehicle.

In some embodiments, an automated vehicle that receives this digital data includes an automated driving system which uses the digital data to increase a confidence that it has identified all the objects in the roadway environment and to increase a confidence that it has correctly classified these objects. In this way, the sensor system beneficially reduces instances where an automated driving system fails to detect an object that is occluded or located too far away (e.g., outside of sensor range) to classify accurately by a single automated vehicle alone.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by a data processing apparatus, cause the apparatus to perform the actions.

One general aspect includes a method implemented by an ego vehicle, the method including: receiving, from a set of remote vehicles, a set of sensor data describing a set of preliminary heatmaps for a roadway environment, where the heatmaps included in the set of preliminary heatmaps describe objects in the roadway environment as observed by onboard sensors of individual remote vehicles included in the set of remote vehicles; reconciling discrepancies in the set of heatmaps and a preliminary heatmap of the ego vehicle to form a combined heatmap that describes the objects in the roadway environment as collectively observed by the onboard sensors of the set of remote vehicles and the ego vehicle; providing the combined heatmap to one or more of the remote vehicles included in the set of remote vehicles; and modifying an operation of the ego vehicle based on the combined heatmap. Other embodiments of this aspect include corresponding computer systems, apparatus, and computer programs recorded on one or more computer storage devices, each configured to perform the actions of the methods.

Implementations may include one or more of the following features. The method where the preliminary heatmap is a two-dimensional electronic map. The method where the preliminary heatmap includes a bounding box around each object identified in the roadway environment. The method where the preliminary heatmap describes one or more of the following: a preliminary estimate of a position of the objects within the environment; a preliminary classification for each object; and a preliminary confidence value that the preliminary classification is correct. The method where the combined heatmap is a three-dimensional electronic map. The method where the combined heatmap removes one or more of the following that are present in the preliminary heatmap for an individual remote vehicle: an occlusion; a missed detection of an object; and an uncertain detection of an object. The method where the ego vehicle is an autonomous vehicle. The method where the ego vehicle is a highly autonomous vehicle. Implementations of the described techniques may include hardware, a method or process, or computer software on a computer-accessible medium.

One general aspect includes a system of an ego vehicle including: a processor that is communicatively coupled to a non-transitory memory, where the non-transitory memory stores computer code which, when executed by the processor, causes the processor to: receive, from a set of remote vehicles, a set of sensor data describing a set of preliminary heatmaps for a roadway environment, where the heatmaps included in the set of preliminary heatmaps describe objects in the roadway environment as observed by onboard sensors of individual remote vehicles included in the set of remote vehicles; reconcile discrepancies in the set of heatmaps and a preliminary heatmap of the ego vehicle to form a combined heatmap that describes the objects in the roadway environment as collectively observed by the onboard sensors of the set of remote vehicles and the ego vehicle; provide the combined heatmap to one or more of the remote vehicles included in the set of remote vehicles; and modify an operation of the ego vehicle based on the combined heatmap. Other embodiments of this aspect include corresponding computer systems, apparatus, and computer programs recorded on one or more computer storage devices, each configured to perform the actions of the methods.

Implementations may include one or more of the following features. The system where the preliminary heatmap is a two-dimensional electronic map. The system where the preliminary heatmap includes a bounding box around each object identified in the roadway environment. The system where the preliminary heatmap describes one or more of the following: a preliminary estimate of a position of the objects within the environment; a preliminary classification for each object; and a preliminary confidence value that the preliminary classification is correct. The system where the combined heatmap is a three-dimensional electronic map. The system where the combined heatmap removes one or more of the following that are present in the preliminary heatmap for an individual remote vehicle: an occlusion; a missed detection of an object; and an uncertain detection of an object. The system where the ego vehicle is an autonomous vehicle. The system where the ego vehicle is a highly autonomous vehicle. Implementations of the described techniques may include hardware, a method or process, or computer software on a computer-accessible medium.

One general aspect includes a computer program product of an ego vehicle including a non-transitory memory storing computer-executable code that, when executed by a processor, causes the processor to: receive, from a set of remote vehicles, a set of sensor data describing a set of preliminary heatmaps for a roadway environment, where the heatmaps included in the set of preliminary heatmaps describe objects in the roadway environment as observed by onboard sensors of individual remote vehicles included in the set of remote vehicles; reconcile discrepancies in the set of heatmaps and a preliminary heatmap of the ego vehicle to form a combined heatmap that describes the objects in the roadway environment as collectively observed by the onboard sensors of the set of remote vehicles and the ego vehicle; provide the combined heatmap to one or more of the remote vehicles included in the set of remote vehicles; and modify an operation of the ego vehicle based on the combined heatmap. Other embodiments of this aspect include corresponding computer systems, apparatus, and computer programs recorded on one or more computer storage devices, each configured to perform the actions of the methods.

Implementations may include one or more of the following features. The computer program product where the preliminary heatmap is a two-dimensional electronic map. The computer program product where the preliminary heatmap includes a bounding box around each object identified in the roadway environment. Implementations of the described techniques may include hardware, a method or process, or computer software on a computer-accessible medium.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1A:
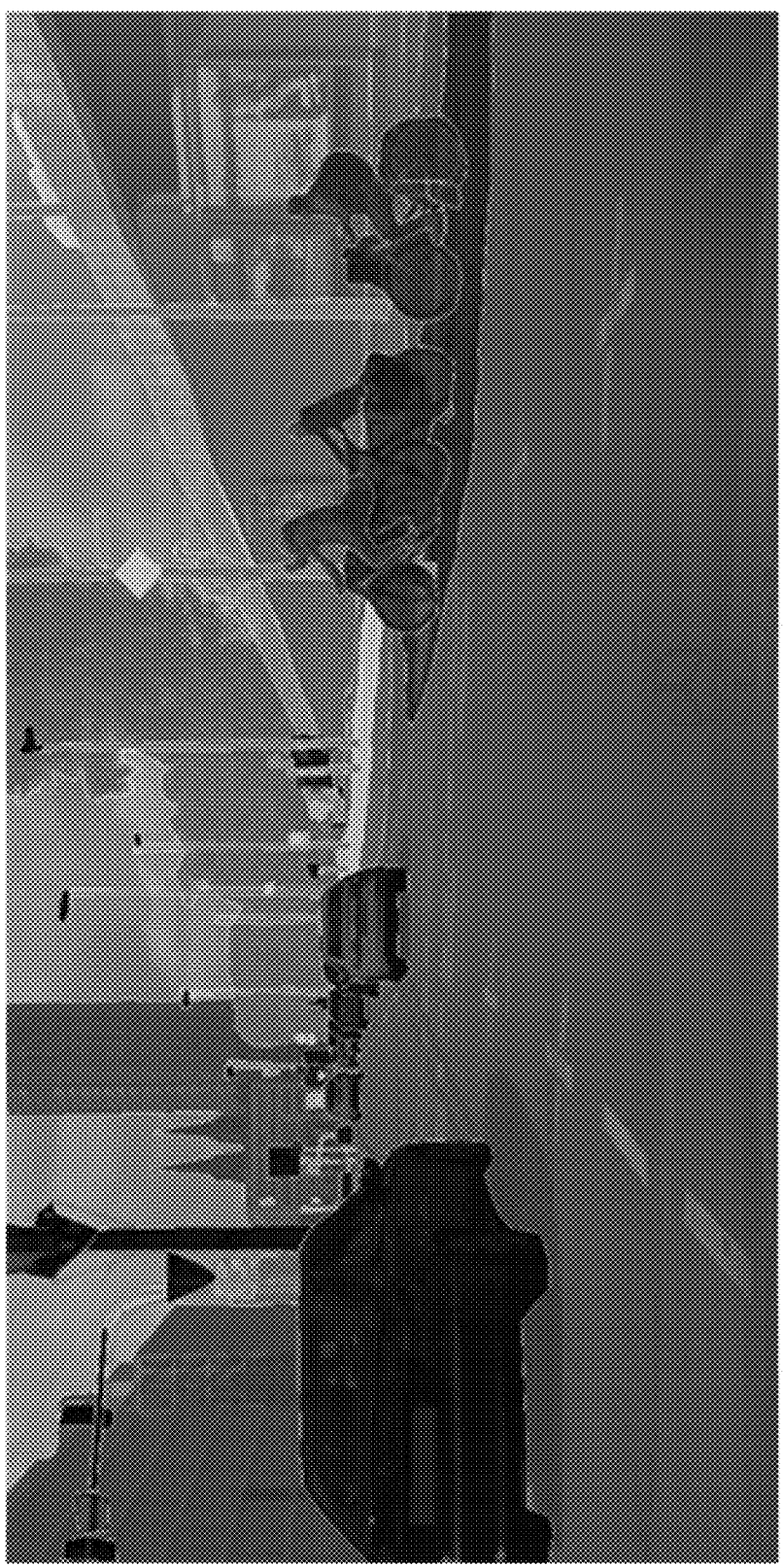
FIG. 1A is a diagram illustrating an example of a semantically segmented image according to some embodiments.

Examples of an ADAS system may include one or more of the following elements of a real-world vehicle: an adaptive cruise control (ACC) system; a lane keeping assistant system (LKA); an adaptive high beam system; an adaptive light control system; an automatic parking system; an automotive night vision system; a blind spot monitor; a collision avoidance system; a crosswind stabilization system; a driver drowsiness detection system; a driver monitoring system; an emergency driver assistance system; a forward collision warning system; an intersection assistance system; an intelligent speed adaption system; a lane departure warning system; a pedestrian protection system; a traffic sign recognition system; a turning assistant; and a wrong-way driving warning system.

The ADAS system may also include any software or hardware included in a real-world vehicle that makes that vehicle be an autonomous vehicle or a semi-autonomous vehicle.

In some embodiments, the ADAS system may be a vehicular system that is operable to perform or control the performance of one or more of the following vehicle functions: the steering of the vehicle; the braking of the vehicle; the acceleration of the vehicle; the operation of a transmission of the vehicle; and how aggressive or passive (e.g., fast or slow, respectively) the transmission changes one or more gears of the transmission. In this way, the ADAS system modifies the operation of an autonomous or semi-autonomous vehicle.

In some embodiments, the ADAS system may be a vehicular system that is operable to perform or control the performance of one or more of the following vehicle functions: how easily a steering wheel of the vehicle is turned by a driver of the vehicle; how much resistance the steering wheel provides to the driver when the driver attempts to turn the steering wheel; how readily a braking system of the vehicle decelerates or stops the vehicle when the driver depresses a braking pedal of the vehicle; how readily the engine of the vehicle accelerates when the driver of the vehicle depresses an accelerator of the vehicle; how aggressive or passive (e.g., fast or slow, respectively) the transmission changes one or more gears of the transmission when the driver of the vehicle provides an input that is operable to affect how or when the transmission changes the one or more gears of the transmission; and how sluggish an engine of the vehicle performs when the driver provides an input that is operable to affect the operation of the engine. In this way, an ADAS system of the vehicle is operable to affect the performance or operation of one or more vehicle components (or their apparent performance as viewed from the perspective of the driver of the vehicle), including, for example: a power steering pump of the vehicle; a braking system of the vehicle; a fuel line of the vehicle; a fuel injector of the vehicle; a transmission of the vehicle; and an engine of the vehicle.

In some embodiments, the vehicle that includes the sensor system is a DSRC-equipped vehicle. A DSRC-equipped vehicle is a vehicle which includes a DSRC radio and is operable to lawfully send and receive DSRC messages in a jurisdiction where the DSRC-equipped vehicle is located. A DSRC radio is hardware that includes a DSRC receiver and a DSRC transmitter. The DSRC radio is operable to wirelessly send and receive DSRC messages.

A DSRC message is a wireless message that is specially configured to be send and received by highly mobile devices such as vehicles, and is compliant with one or more of the following DSRC standards, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); and EN 13372:2004 Dedicated Short-Range Communication (DSRC)—DSRC profiles for RTTT applications (review); EN ISO 14906:2004 Electronic Fee Collection—Application interface.

In the United States, Europe, and Asia, DSRC messages are transmitted at 5.9 GHz. In the United States, DSRC messages are allocated 75 MHz of spectrum in the 5.9 GHz band. In Europe and Asia, DSRC messages are allocated 30 MHz of spectrum in the 5.9 GHz band. A wireless message, therefore, is not a DSRC message unless it operates in the 5.9 GHz band. A wireless message is also not a DSRC message unless it is transmitted by a DSRC transmitter of a DSRC radio.

Accordingly, a DSRC message is not any of the following: a Wireless Fidelity (WiFi) message; a 3G message; a 4G message; a Long-Term Evolution (LTE) message; a millimeter wave communication message; a Bluetooth message; a satellite communication; and a short-range radio message transmitted or broadcast by a key fob at 315 MHz or 433.92 MHz. For example, in the United States, key fobs for remote keyless systems include a short-range radio transmitter which operates at 315 MHz, and transmissions or broadcasts from this short-range radio transmitter are not DSRC messages since, for example, such transmissions or broadcasts do not comply with any DSRC standard, are not transmitted by a DSRC transmitter of a DSRC radio and are not transmitted at 5.9 GHz. In another example, in Europe and Asia, key fobs for remote keyless systems include a short-range radio transmitter which operates at 433.92 MHz, and transmissions or broadcasts from this short-range radio transmitter are not DSRC messages for similar reasons as those described above for remote keyless systems in the United States.

The wireless messages of key fobs made as a component of a remote keyless entry system are not DSRC messages for additional reasons. For example, the payload for a DSRC message is also required to include digital data describing a rich amount of vehicular data of various types of data. In general, a DSRC message always includes, at a minimum, a unique identifier of the vehicle which transmits the DSRC message as well as the Global Positioning System (GPS) data for that vehicle. This amount of data requires a larger bandwidth than what is possible for other types of non-DSRC wireless messages. For example, a key fob merely transmits a wireless message including a digital key which is known to a vehicle which is paired with the key fob; there is not sufficient bandwidth for other data to be included in the payload because the bandwidth allocated for these transmissions is very small. By comparison, DSRC messages are allocated large amounts of bandwidth and are required to include a far richer amount of data, including, for example, a unique identifier and the GPS data for the vehicle which transmitted the DSRC message.

In some embodiments, a DSRC-equipped vehicle does not include a conventional global positioning system unit ("GPS unit"), and instead includes a DSRC-compliant GPS unit. A conventional GPS unit provides positional information that describes a position of the conventional GPS unit with an accuracy of plus or minus 10 meters of the actual position of the conventional GPS unit. By comparison, a DSRC-compliant GPS unit provides GPS data that describes a position of the DSRC-compliant GPS unit with an accuracy of plus or minus 1.5 meters of the actual position of the DSRC-compliant GPS unit. This degree of accuracy is referred to as "lane-level accuracy" since, for example, a lane of a roadway is generally about 3 meters wide, and an accuracy of plus or minus 1.5 meters is sufficient to identify which lane a vehicle is traveling in on a roadway.

In some embodiments, a DSRC-compliant GPS unit is operable to identify, monitor and track its two-dimensional (2D) position within 1.5 meters of its actual position 68% of the time under an open sky.

Referring now to FIG. 1A, depicted is a block diagram illustrating an example of a semantically segmented image 171 according to some embodiments.

An automated vehicle operates in a roadway environment. For the automated vehicle to operate effectively, it must include onboard sensors that are able to perceive the operating environment in a meaningful way. This includes, for example, detecting each of the objects in the operating environment and the identity (i.e., classification) of these objects. These objects may include road markers, other vehicles, bicyclists, pedestrians, etc.

The semantically segmented image 171 includes objects detected by the automated driving system. The objects included in the semantically segmented image 171 are color coded according to their object classification.

From the perspective of a single automated vehicle travelling down the road, some objects may be occluded or too distant to identify accurately. In some embodiments, the sensor system described herein uses intervehicle communication technology to enable two or more vehicles (at least one of which is the automated vehicle that includes the sensor system 199 described herein) to share digital data with one another and enable their onboard systems (e.g., an automated driving system) to perceive the roadway environment more fully relative to the perception abilities of these onboard systems without the benefit of the digital data.

Figure 1B:
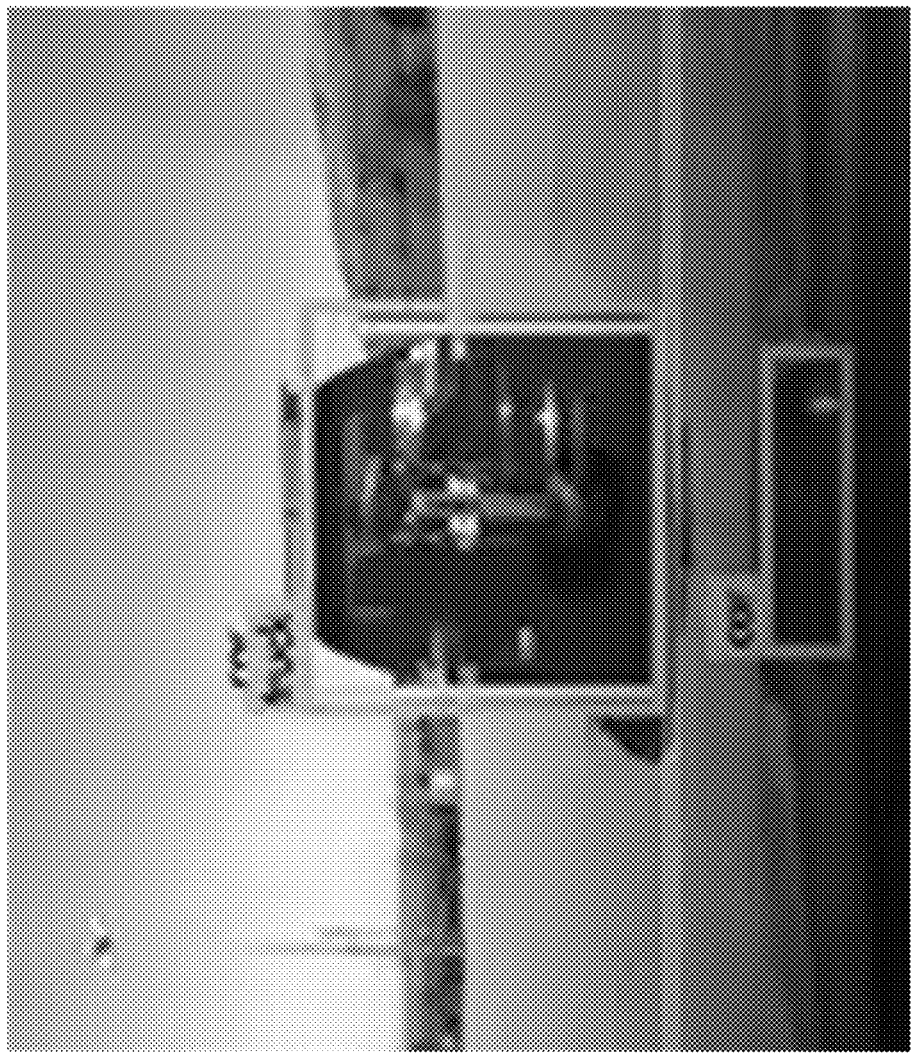
FIG. 1B is a diagram illustrating a first example problem with existing automated driving systems.

Referring to FIG. 1B, depicted is a block diagram illustrating a first example problem 172 with existing automated driving systems.

The first example problem 172 depicts how existing solutions have trouble perceiving the roadway environment from a single viewpoint. As depicted in FIG. 1B, a sports utility vehicle (SUV) is classified twice as a car and a truck by an automated driving system, and the reflection of the SUV on the roadway surface is also classified as a car. These classifications are spurious and spontaneously flip back and forth as they are occurring in real time. Having multiple viewpoints or perspectives would help the automated driving system to detect the SUV more accurately. The embodiments of the sensor system 199 described herein overcomes this deficiency because it provides an autonomous driving system with digital data that describes the SUV from multiple viewpoints or perspectives.

Figure 1C:
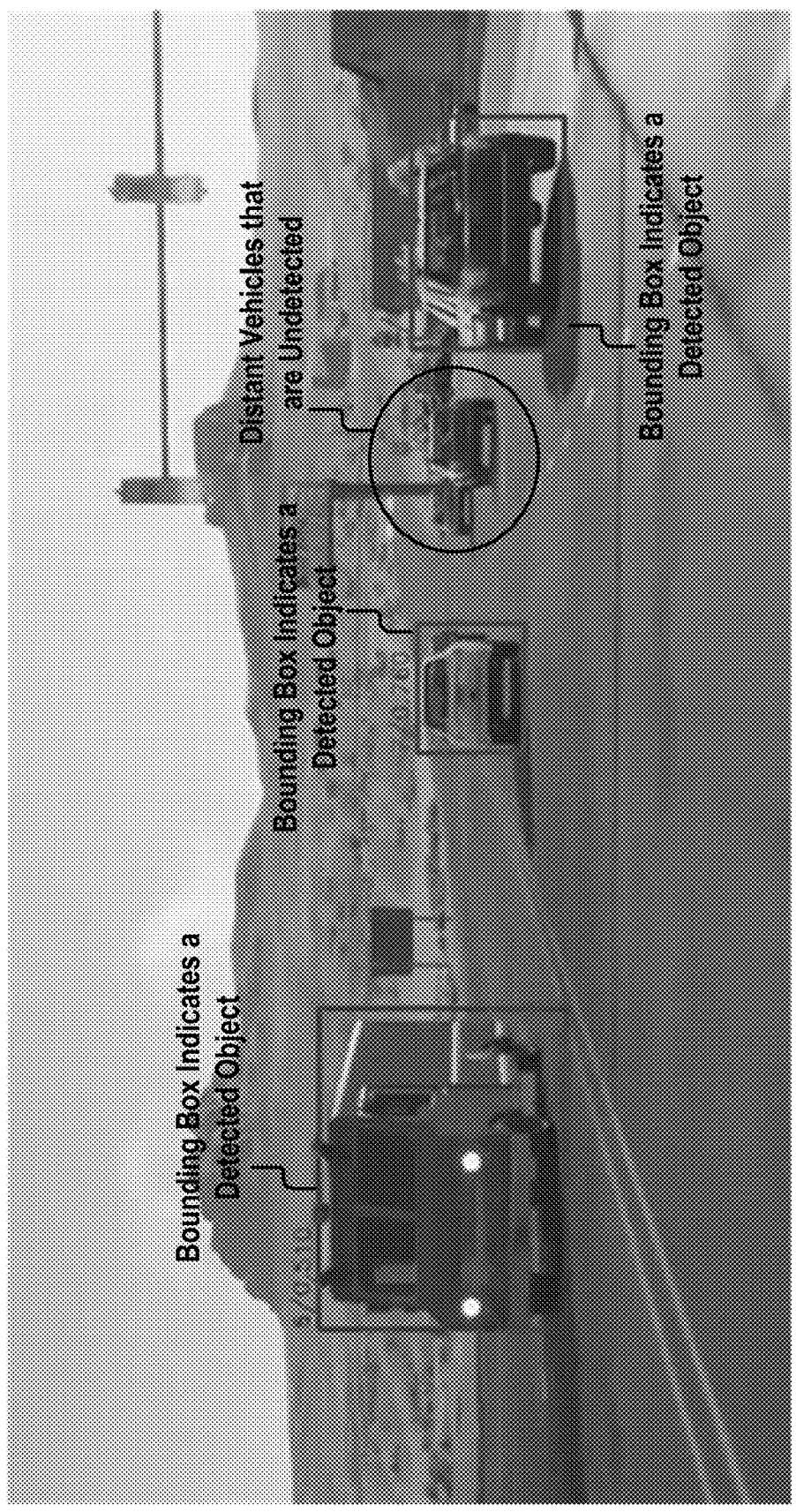
FIG. 1C is a diagram illustrating a second example problem with existing automated driving systems.

Referring now to FIG. 1C, depicted is a block diagram illustrating a second example problem 173 with existing automated driving systems. The second example problem 173 includes an existing automated driving system that fails to detect vehicles that are too distant (e.g., outside of the sensor range of a single-perspective automated driving system). Having multiple viewpoints or perspectives would help the automated driving system to detect the distant vehicles. The embodiments of the sensor system 199 described herein overcomes this deficiency because it provides an autonomous driving system with digital data that describes the distant vehicles from multiple viewpoints or perspectives by vehicles that are within sensor range of these distance vehicle, thereby allowing the distant vehicles to be detected by a vehicle including the sensor system 199 whose sensors would otherwise not be able to detect the distant vehicles.

Figure 1D:
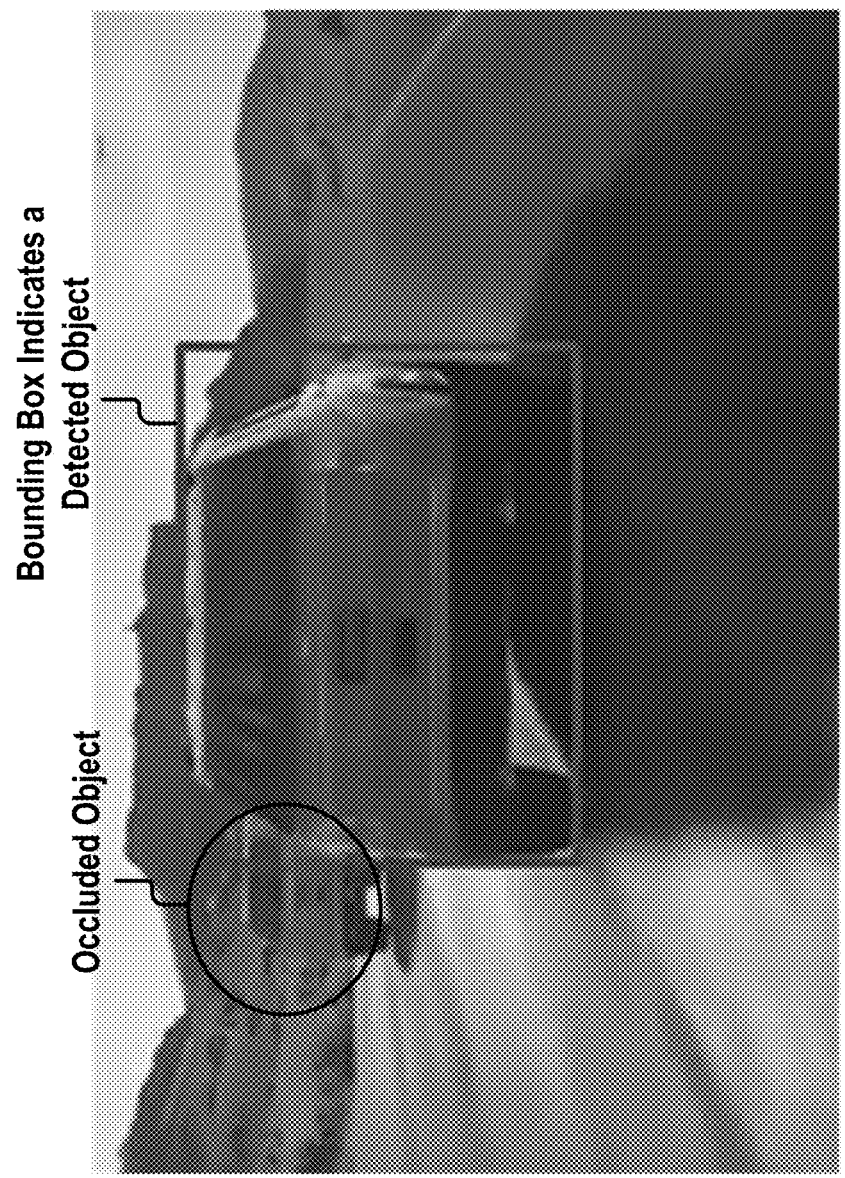
FIG. 1D is a diagram illustrating a third example problem with existing automated driving systems.

Referring now to FIG. 1D, depicted is a block diagram illustrating a third example problem 174 with existing automated driving systems. The third example problem 174 includes an existing automated driving system that fails to detect a vehicle that is occluded by another object (here, a nearby SUV). Having multiple viewpoints or perspectives would help the automated driving system to detect the occluded object. The embodiments of the sensor system 199 described herein overcomes this deficiency because it provides an autonomous driving system with digital data that describes the occluded object from multiple viewpoints or perspectives, thereby allowing the occluded object to be detected by the autonomous driving system that includes the sensor system 199.

Figure 1E:
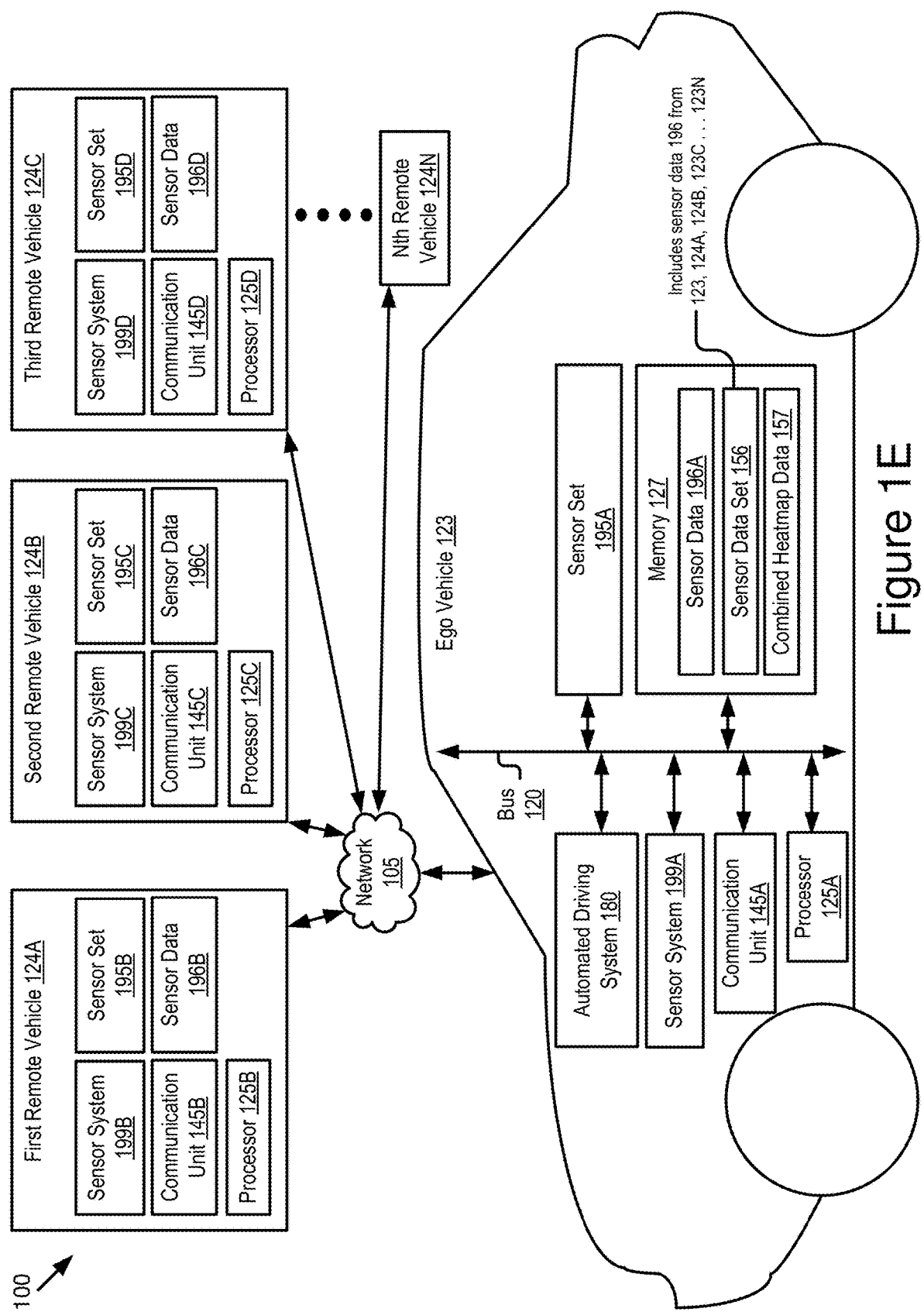
FIG. 1E is a diagram illustrating an operating environment for a sensor system according to some embodiments.

Referring now to FIG. 1E, depicted is a block diagram illustrating an operating environment 100 for a sensor system according to some embodiments.

The operating environment 100 as depicted includes an ego vehicle 123 (herein "vehicle 123" if singular, or "vehicles 123" if plural), a first remote vehicle 124A, a second remote vehicle 124B, a third remote vehicle 124C . . . and an Nth remote vehicle 124N (where "N" indicates any positive integer of remote vehicles 124N greater than three). These elements may be communicatively coupled to one another via a network 105.

The first remote vehicle 124A, the second remote vehicle 124B, the third remote vehicle 124C and the Nth remote vehicle 124N may be referred to collectively or individually as the "remote vehicle 124" if singular, or the "remote vehicles 124" if plural.

Although one vehicle 123 and one network 105 are depicted in FIG. 1E, in practice the operating environment 100 may include one or more vehicles 123 or one or more networks 105.

Although not depicted in FIG. 1E, in some embodiments the operating environment 100 includes an RSU that is communicatively coupled to the network 105 and operable to relay wireless messages among the endpoints of the network 105. The endpoints of the network 105 include the vehicle 123 and the remote vehicles 124.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, Dedicated Short-Range Communication (DSRC), full-duplex wireless communication, etc. The network 105 may also include a mobile data network that may include 3G, 4G, LTE, LTE-V2X, VoLTE or any other mobile data network or combination of mobile data networks. Further, the network 105 may include one or more IEEE 802.11 wireless networks.

The network 105 may include one or more communication channels shared among the vehicle 123 and the digital twin server 107. The communication channel may include DSRC, LTE-V2X, full-duplex wireless communication or any other wireless communication protocol. For example, the network 105 may be used to transmit a DSRC message, a DSRC probe, a Basic Safety Message (BSM) or a full-duplex message including any of the data described herein.

The vehicle 123 is any type of connected vehicle. For example, the vehicle 123 is one of the following types of vehicles: a car; a truck; a sports utility vehicle; a bus; a semi-truck; a drone or any other roadway-based conveyance.

In some embodiments, the vehicle 123 is an autonomous vehicle or a semi-autonomous vehicle. For example, the vehicle 123 includes an automated driving system 180. The automated driving system 180 includes a set of ADAS systems. The set of ADAS systems provide sufficient autonomous features to the vehicle 123 to render the vehicle 123 an autonomous vehicle. The National Highway Traffic Safety Administration (NHTSA) has defined different "levels" of autonomous vehicles, e.g., Level 0, Level 1, Level 2, Level 3, Level 4, and Level 5. If a vehicle 123 has a higher-level number than another vehicle 123 (e.g., Level 3 is a higher-level number than Levels 2 or 1), then the vehicle 123 with a higher-level number offers a greater combination and quantity of autonomous features relative to the vehicle 123 with the lower level number. The different levels of autonomous vehicles are described briefly below.

Level 0: The set of ADAS systems installed in the vehicle 123 have no vehicle control but may issue warnings to the driver of the vehicle 123.

Level 1: The driver must be ready to take control of the vehicle 123 at any time. The set of ADAS systems installed in the vehicle 123 may provide autonomous features such as one or more of the following: an ACC; and Parking Assistance with automated steering and LKA Type II, in any combination.

Level 2: The driver is obliged to detect objects and events in the roadway environment and respond if the set of ADAS systems installed in the vehicle 123 fail to respond properly (based on the driver's subjective judgement). The set of ADAS systems installed in the vehicle 123 executes accelerating, braking, and steering. The set of ADAS systems installed in the vehicle 123 can deactivate immediately upon takeover by the driver.

Level 3: Within known, limited environments (such as freeways), the driver can safely turn their attention away from driving tasks but must still be prepared to take control of the vehicle 123 when needed.

Level 4: The set of ADAS systems installed in the vehicle 123 can control the vehicle 123 in all but a few environments such as severe weather. The driver must enable the automated system (which is comprised of the set of ADAS systems installed in the vehicle 123) only when it is safe to do so. When the automated system is enabled, driver attention is not required for the vehicle 123 to operate safely and consistent with accepted norms.

Level 5: Other than setting the destination and starting the system, no human intervention is required. The automated system can drive to any location where it is legal to drive and make its own decision (which may vary based on the jurisdiction where the vehicle 123 is located).

In some embodiments, the vehicle 123 is a Highly Autonomous Vehicle ("HAV" if singular, or "HAVs" if plural). An HAV is a vehicle 123 (e.g., the DSRC-equipped ego vehicle) that includes a set of ADAS systems that operate at Level 3 or higher as described and above, or as defined by the NHTSA on page 9 of their policy paper entitled "Federal Automated Vehicles Policy: Accelerating the Next Revolution in Roadway Safety," which was published in September of 2016.

In some embodiments, the vehicle 123 includes one or more of the following elements: a processor 125A; a memory 127; a communication unit 145A; an automated driving system 180; a sensor set 195A; and a sensor system 199A. These elements of the vehicle 123 are communicatively coupled to one another via a bus 120. Although only one of each of these elements are depicted in FIG. 1E, in practice the vehicle 123 may include one or more processors 125A, one or more memories 127, one or more communication units 145A, one or more autonomous driving systems 180, one or more sensor sets 195A, and one or more sensor systems 199A.

The remote vehicles 124 include elements similar to the vehicle 123. For example, the first remote vehicle 124A as depicted includes the following elements: a sensor system 199B; a sensor set 195B; a communication unit 145B; sensor data 196B; and a processor 125B. The second remote vehicle 124B as depicted includes the following elements: a sensor system 199C; a sensor set 195C; a communication unit 145C; sensor data 196C; and a processor 125C. The third remote vehicle 124C as depicted includes the following elements: a sensor system 199D; a sensor set 195D; a communication unit 145D; sensor data 196D; and a processor 125D. The remote vehicles 124 each include a non-transitory memory that stores the sensor data 196B, 196C, 196D.

The processors 125A, 125B, 125C, 125D may be referred to herein collectively or individually as the "processor 125" since, for example, the processor 125A of the vehicle 123 provides similar functionality to the components of the vehicle 123 as does the processor 125B of the first remote vehicle 124A. For similar reasons, the description provided herein uses the following terms when referring to elements that are common to the vehicle 123 and the remote vehicles 124: the "sensor system 199" when referring to the sensor system 199A, the sensor system 199B, the sensor system 199C, and the sensor system 199D, collectively or individually; the "sensor set 195" when referring to the sensor set 195A, the sensor set 195B, the sensor set 195C, and the sensor set 195D, collectively or individually; the "communication unit 145" when referring to the communication unit 145A, the communication unit 145B, the communication unit 145C, and the communication unit 145D, collectively or individually; and the "sensor data 196" when referring to the sensor data 196A, the sensor data 196B, the sensor data 196C, and the sensor data 196D, collectively or individually.

In some embodiments, the processor 125 and the memory 127 may be elements of an onboard vehicle computer system of the vehicle 123. The onboard vehicle computer system may be operable to cause or control the operation of one or more of the following elements: one or more ADAS systems included in the automated driving system 180; the sensor set 195; the communication unit 145; the processor 125; and the memory 127; and the sensor system 199. The onboard vehicle computer system may be operable to access and execute the data stored on the memory 127 to provide the functionality described herein for the sensor system 199. The onboard vehicle computer system may be operable execute the sensor system 199 which causes the onboard vehicle computer system to execute one or more of the steps of the method 300 described below with reference to FIG. 3.

The automated driving system 180 includes one or more ADAS systems. The ADAS systems provide one or more autonomous features to the vehicle 123. In some embodiments, the vehicle 123 is an autonomous vehicle, a semi-autonomous vehicle, or an HAV. For example, the vehicle 123 includes a set of ADAS systems that provide autonomous features to the vehicle 123, which are sufficient to render the vehicle 123 an autonomous vehicle.

The ADAS systems may include one or more of the following elements: an ACC system; an adaptive high beam system; an adaptive light control system; an automatic parking system; an automotive night vision system; a blind spot monitor; a collision avoidance system; a crosswind stabilization system; a driver drowsiness detection system; a driver monitoring system; an emergency driver assistance system; a forward collision warning system; an intersection assistance system; an intelligent speed adaption system; a lane departure warning system (also referred to as a lane keep assistant); a pedestrian protection system; a traffic sign recognition system; a turning assistant; a wrong-way driving warning system; autopilot; sign recognition; and sign assist. Each of these example ADAS systems provide their own features and functionality that may be referred to herein as an "ADAS feature" or "ADAS functionality," respectively. The features and functionality provided by these example ADAS systems are also referred to herein as an "autonomous feature" or an "autonomous functionality," respectively.

The sensor set 195 includes any onboard sensors of the vehicle 123 which monitor the roadway environment of the vehicle 123, whether internally or externally. In some embodiments, the sensor set 195 may include any sensors in the vehicle 123 that generate sensor data during a journey. In some embodiments, the sensor set 195 of the vehicle 123 may include one or more of the following vehicle sensors: a vibrometer; a collision detection system; an engine oil pressure detection sensor; a camera (e.g., one or more of an internal camera and an external camera); a LIDAR sensor; an ultrasonic sensor; a radar sensor; a laser altimeter; an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensor. The sensor system 199 stores digital data describing the measurements generated by these onboard sensors as the sensor data 196 which is stored in the memory 127.

The communication unit 145 transmits and receives data to and from a network 105 or to another communication channel. In some embodiments, the communication unit 145 may include a DSRC transceiver, a DSRC receiver and other hardware or software necessary to make the vehicle 123 (or some other device such as the digital twin server 107) a DSRC-equipped device.

In some embodiments, the communication unit 145 includes a port for direct physical connection to the network 105 or to another communication channel. For example, the communication unit 145 includes a USB, SD, CAT-5, or similar port for wired communication with the network 105. In some embodiments, the communication unit 145 includes a wireless transceiver for exchanging data with the network 105 or other communication channels using one or more wireless communication methods, including: IEEE 802.11; IEEE 802.16, BLUETOOTH®; EN ISO 14906:2004 Electronic Fee Collection—Application interface EN 11253: 2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471,387 filed on Aug. 28, 2014 and entitled "Full-Duplex Coordination System"; or another suitable wireless communication method.

In some embodiments, the communication unit 145 includes a full-duplex coordination system as described in U.S. patent application Ser. No. 14/471,387 filed on Aug. 28, 2014 and entitled "Full-Duplex Coordination System," the entirety of which is hereby incorporated by reference.

In some embodiments, the communication unit 145 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 145 includes a wired port and a wireless transceiver. The communication unit 145 also provides other conventional connections to the network 105 for distribution of files or media objects using standard network protocols including TCP/IP, HTTP, HTTPS, and SMTP, millimeter wave, DSRC, etc.

The processor 125 includes an arithmetic logic unit, a microprocessor, a general-purpose controller, or some other processor array to perform computations and provide electronic display signals to a display device. The processor 125 processes data signals and may include various computing architectures including a complex instruction set computer (CISC) architecture, a reduced instruction set computer (RISC) architecture, or an architecture implementing a combination of instruction sets. The vehicle 123 may include one or more processors 125. Other processors, operating systems, sensors, displays, and physical configurations may be possible.

The memory 127 stores instructions or data that may be accessed and executed by the processor 125. The instructions or data may include code for performing the techniques described herein. The memory 127 may be a dynamic random-access memory (DRAM) device, a static random-access memory (SRAM) device, flash memory, or some other memory device. In some embodiments, the memory 127 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. A portion of the memory 127 may be reserved for use as a buffer or virtual random-access memory (virtual RAM). The vehicle 123 may include one or more memories 127.

The memory 127 of the vehicle 123 stores one or more of the following: sensor data 196; sensor data set 156; and combined heatmap data 157.

The sensor data 196 is digital data that describes, among other things, one or more of the following: the position of the vehicle 123; the position of one or more remote vehicles 124; the heading of the vehicle 123; the heading of one or more remote vehicles 124; and any other sensor measurements recorded by the sensor set 195 of the vehicle 123.

The sensor data set 156 is a data structure that stores the sensor data 196 of the vehicle as well as the sensor data 196 which is wirelessly received via the network 105 from the remote vehicles 124. The sensor data 196 of the remote vehicles 124 is received by the communication unit 145 of the vehicle 123 and stored in the memory 127 by the sensor system 199 to form the sensor data set 156.

The combined heatmap data 157 is digital data that describes a combined heatmap that is built based on the sensor data set 156. The combined heatmap is described in more detail below with reference to FIGS. 2-10.

Figure 3:
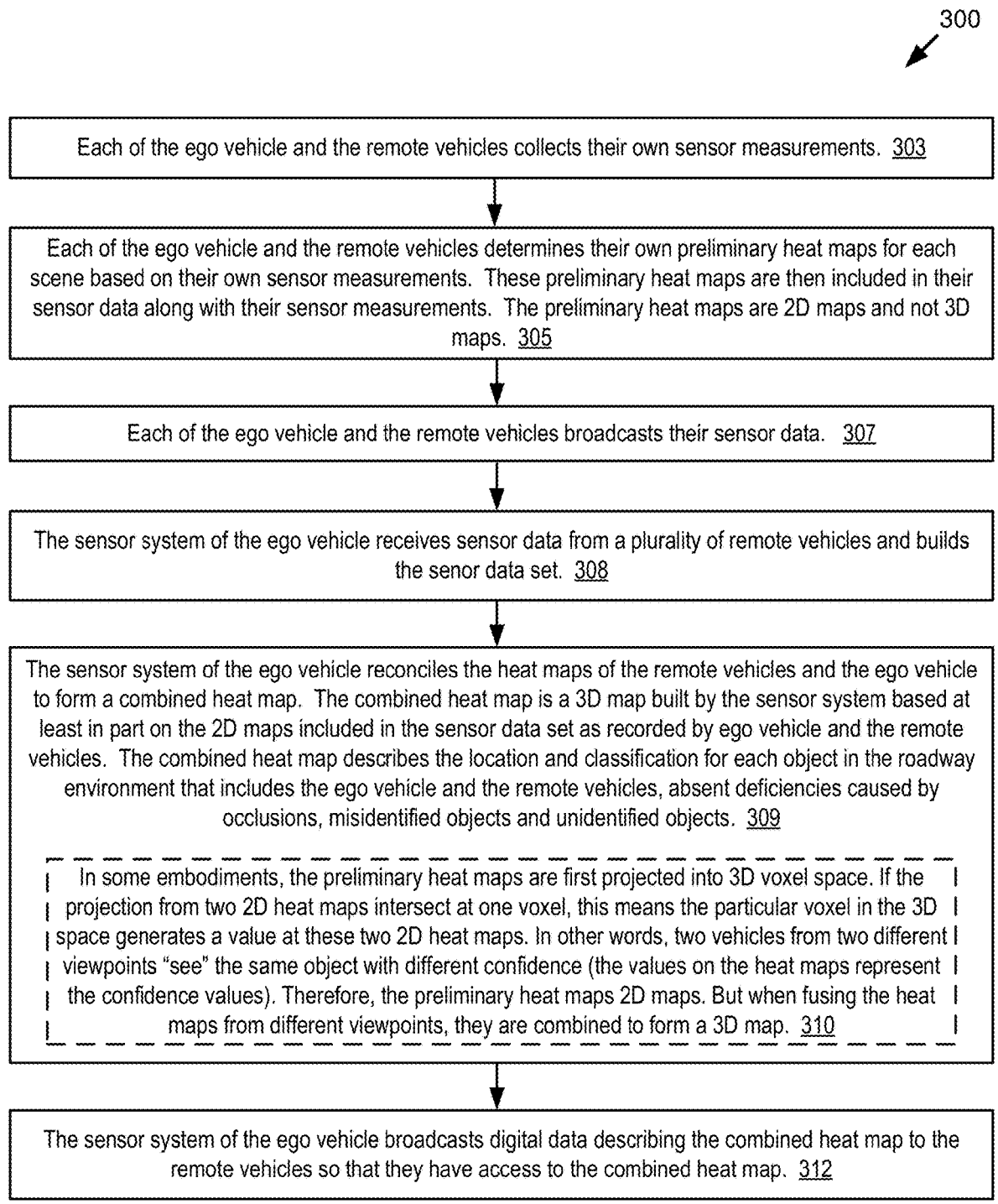
FIG. 3 includes a flowchart of an example method for sharing combined heatmap data among one or more automated vehicles according to some embodiments.

In some embodiments, the sensor system 199 includes code or routines that, when executed by the processor 125, causes the processor 125 to execute one or more steps of the method 300 depicted in FIG. 3.

In some embodiments, the sensor system 199 is installed in an electronic control unit (ECU) of the vehicle 123. In some embodiments, the sensor system 199 cooperates with the automated driving system 180 to provide autonomous driving functionality to the vehicle 123. In this way, the sensor system 199 provides combined heatmap data 157 to the autonomous driving system 180 that beneficially provides the autonomous driving system 180 with increased information about the roadway environment and thereby modifies and improves the operation of the autonomous driving system 180. In some embodiments, the sensor system 199 includes one or more of the following elements: a communication module; a sensor module; a fusion module; and a localization module. The functionality of these modules of the sensor system 199 are described in more detail below with reference to FIGS. 2-10.

In some embodiments, the sensor system 199 of the vehicle 123 may be implemented using hardware including a field-programmable gate array ("FPGA") or an application-specific integrated circuit ("ASIC"). In some other embodiments, the sensor system 199 may be implemented using a combination of hardware and software.

The sensor system 199 is described in more detail below with reference to FIGS. 2-10.

The remote vehicles 124 are vehicles that are similar to the vehicle 123. The remote vehicles 124 include elements that are similar to those described below with reference to the vehicle 123, and so, those descriptions will not be repeated here.

In some embodiments, a remote vehicle 124 includes an automated driving system 180 that renders the remote vehicle 124 an autonomous vehicle. In some embodiments, the remote vehicle 124 is not an autonomous vehicle but still includes an instance of the sensor system 199.

In some embodiments, the sensor system 199 of the remote vehicle 124 includes code and routines that are operable, when executed by the processor 125 of the remote vehicle 124, to cause the processor 125 to execute one or more of the following steps: record the sensor data 196; build a wireless message including the sensor data 196 as a payload for the wireless message; and cause the communication unit 145 of the remote vehicle 124 to wirelessly transmit the wireless message to the vehicle 123 via the network 105. In some embodiments, this wireless message is broadcast by the communication unit 145 of the remote vehicle 124 and received by the communication unit 145 of the vehicle 123. In some embodiments, this wireless message is unicast by the communication unit 145 of the remote vehicle 124 and received by the communication unit 145 of the vehicle 123.

Figure 2:
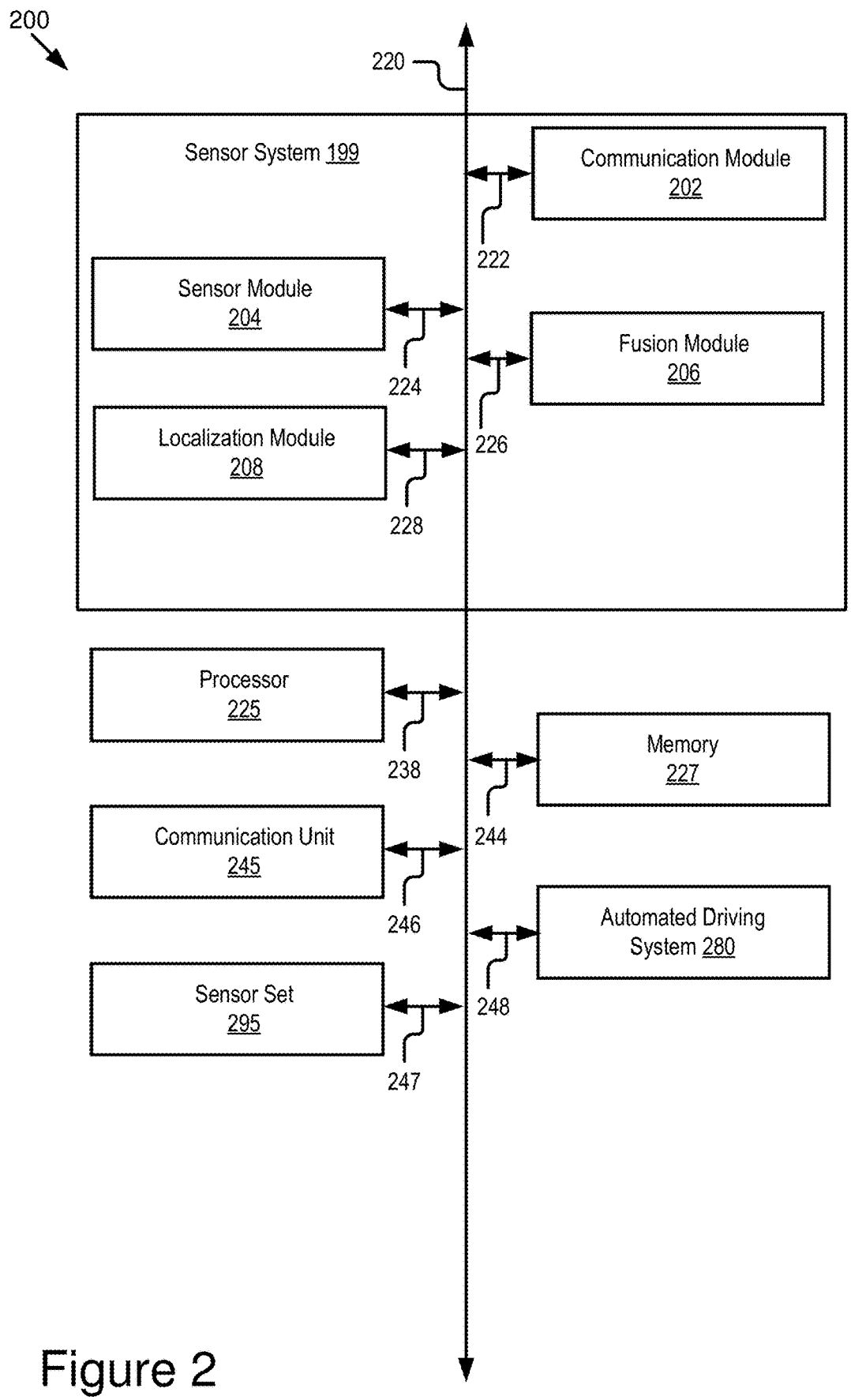
FIG. 2 is a block diagram illustrating an example computer system including the sensor system according to some embodiments.

Referring now to FIG. 2, depicted is a block diagram illustrating an example computer system 200 including a sensor system 199 according to some embodiments.

In some embodiments, the computer system 200 includes a special-purpose computer system that is programmed to perform one or more steps of a method 300 described below with reference to FIG. 3.

In some embodiments, the computer system 200 is an element of the vehicle 123. In some embodiments, the computer system 200 is an element of the remote vehicle 124. In some embodiments, the computer system 200 may be an onboard vehicle computer of the vehicle 123 or the remote vehicle 124. In some embodiments, the computer system 200 includes an ECU, head unit or some other processor-based computing device of the vehicle 123 or the remote vehicle 124.

The computer system 200 may include one or more of the following elements according to some examples: the sensor system 199; a processor 225; a communication unit 245; the memory 227; the sensor set 295; and the automated driving system 280. The components of the computer system 200 are communicatively coupled by a bus 220.

In the illustrated embodiment, the processor 225 is communicatively coupled to the bus 220 via a signal line 238. The communication unit 245 is communicatively coupled to the bus 220 via a signal line 246. The memory 227 is communicatively coupled to the bus 220 via a signal line 244. The sensor set 295 is communicatively coupled to the bus 220 via a signal line 247. The automated driving system 280 is communicatively coupled to the bus 220 via a signal line 248.

The processor 225 provides the same functionality as the processor 125 described above with reference to FIG. 1E, and so, that description will not be repeated here. The communication unit 245 provides the same functionality as the communication unit 145 described above with reference to FIG. 1E, and so, that description will not be repeated here. The memory 227 provides the same functionality as the memory 127 described above with reference to FIG. 1E, and so, that description will not be repeated here. The sensor set 295 provides the same functionality as the sensor set 195 described above with reference to FIG. 1E, and so, that description will not be repeated here. The automated driving system 280 provides the same functionality as the automated driving system 180 described above with reference to FIG. 1E, and so, that description will not be repeated here.

The memory 227 stores any of the digital data described herein. In some embodiments, the memory 227 stores any digital data or information that is necessary for the sensor system 199 to provide its functionality.

In the illustrated embodiment shown in FIG. 2, the sensor system 199 includes: a communication module 202; a sensor module 204; a fusion module 206 and a localization module 208. The communication module 202, sensor module 204, fusion module 206, and the localization module 208 are now described using terminology that assumes that the computer system 200 is an element of the vehicle 123. However, those having ordinary skill in the art will appreciate that the sensor module 204 and the computer system 200 are elements of the remote vehicle 124 in some embodiments.

The communication module 202 can be software including routines for handling communications between the sensor system 199 and other components of the computer system 200. In some embodiments, the communication module 202 can be a set of instructions executable by the processor 125 to provide the functionality described below for handling communications between the sensor system 199 and other components of the computer system 200 or the operating environment 100.

The communication module 202 sends and receives data, via the communication unit 245, to and from one or more elements of the operating environment 100. The communication module 202 may send or receive any of the data or messages described above with reference to FIG. 1E or below with reference to FIGS. 3-10 via the communication unit 245.

In some embodiments, the communication module 202 receives data from components of the sensor system 199 and stores the data in the memory 227. For example, the communication module 202 receives sensor data transmitted by one or more remote vehicles and stores these instances of sensor data in the memory 227 as the sensor data set.

In some embodiments, the communication module 202 may handle communications between components of the sensor system 199. For example, the communication module 202 may receive digital data from the sensor module 204 and transmit this digital data to the fusion module 206. In this way, the communication module 202 may transmit digital data among any of the modules of the sensor system 199.

In some embodiments, the communication module 202 can be stored in the memory 227 of the computer system 200 and can be accessible and executable by the processor 225. The communication module 202 is adapted for cooperation and communication with the processor 225 and other components of the computer system 200 via signal line 222.

The sensor module 204 can be software including routines for controlling the operation of the sensor set 295 to cause the sensor set 295 to measure sensor data that describes the roadway environment of the vehicle that includes the computer system 200 and information about the vehicle itself. In this way, the sensor module 204 controls the operation of the sensor set 295 and causes the sensor set 295 to record the sensor data.

The sensor data is digital data that describes, among other things, one or more of the following: the position of the vehicle 123; the position of one or more remote vehicles 124; the heading of the vehicle 123; the heading of one or more remote vehicles 124; and any other sensor measurements recorded by the sensor set 295 of the vehicle 123. The sensor data is stored in the memory 227 of the vehicle 123. For example, the vehicle 123 includes an ECU, and this ECU includes a non-transitory memory. The sensor module 204 provides the sensor data to the communication module 202 and the communication module 202 stores the sensor data in the non-transitory memory of the ECU.

In some embodiments, the sensor set 295 includes one or more onboard vehicle sensors that are operable to measure the physical environment of the ego vehicle 123. These sensors include, for example, LIDAR and other range finding sensors, cameras, radar, sonar, and other sensors that contribute to object detection. Also included in the sensor set 295 are sensors and resources that describe information about the vehicle 123 such as, for example, a GPS system that provides GPS data describing a location and heading of the vehicle 123, a speedometer that provides velocity data describing a velocity of the vehicle 123, a clock that provides time data describing a current time when the vehicle 123 is at a particular location, traveling in a certain heading, traveling certain velocity, etc. The GPS data, velocity data, and time data may be included in the sensor data that is stored in the memory 227 by the communication module 202.

In some embodiments, the sensor module 204 includes a deep learning algorithm that analyzes images included in the sensor data to construct preliminary heatmaps and bounding boxes around objects included in the preliminary heatmaps. For example, the sensor set 295 includes one or more imaging devices that captures the one or more images. These preliminary heatmaps and bounding boxes are discussed further below with reference to the "preliminary determinations" of the communication module 202.

In some embodiments, the sensor module 204 can be stored in the memory 227 of the computer system 200 and can be accessible and executable by the processor 225. The sensor module 204 is adapted for cooperation and communication with the processor 225 and other components of the computer system 200 via signal line 224.

In some embodiments, the vehicle 123 and the remote vehicles 124 each include a communication unit 245. The communication unit 245 includes any hardware and software necessary to enable the vehicle 123 and the remote vehicles 124 to transmit wireless messages to one another via 3G, 4G, LTE, 5G, DSRC, mmWave or some other form of wireless communication.

The communication module 202 includes code and routines that, when executed by a processor 225 of the vehicle 123, controls the operation of the communication unit 245 to cause the communication unit 245 to broadcast or unicast the sensor data to the remote vehicles 124. The sensor systems 199 of the remote vehicles 124 also share their sensor data with the vehicle 123. Accordingly, the vehicle 123 and the remote vehicles 124 cooperate with one another to share the sensor data they have recorded with one another. In this way, the vehicle 123 receives the sensor data that is used to construct a sensor data set. The sensor data included in the sensor data set describes the roadway environment of the vehicle 123 from multiple viewpoints or perspective (i.e., one viewpoint for (1) the ego vehicle and (2) each of the remote vehicles). See, e.g., FIG. 6. The sensor data set is stored on the memory 227 of the vehicle by the communication module 202.

The example preliminary determinations are now described according to some embodiments. In some embodiments, the vehicle 123 and the remote vehicles 124 each include a sensor system 199, and the sensor data includes a "preliminary voxel map" or a "preliminary heatmap" which is determined by the sensor system 199 based on the sensor data which a particular vehicle 123, 124 has itself recorded. For example, the communication module 202 includes code and routines that are operable, when executed by the processor 225, to execute a set of preliminary determinates which generate the preliminary voxel map or the preliminary heatmap.

In some embodiments, the preliminary voxel maps and preliminary heatmaps are electronic maps that describe a preliminary estimate of a position of the objects within a three-dimensional (3D) environment of the particular vehicle 123, 124 (e.g., the roadway environment), a preliminary classification for each object (e.g., car, road, bicycle, pedestrian, etc.) and a preliminary confidence value that the preliminary classification is correct. In some embodiments, a preliminary heatmap is a 2D map whereas a preliminary voxel map is a 3D map. A voxel is a 3D pixel. These preliminary determinations (e.g., the preliminary estimate of the position, the preliminary classification, and the preliminary confidence value) are all improved by having access to similar information of the same point in time (i.e., the same "scene") as determined by other nearby vehicles whose sensors are positioned or oriented so that they are operable to perceive the same scene.

In some embodiments, the communication module 202 is operable, when executed by the processor 225, to cause the processor 225 to execute one or more of the following steps: generate the preliminary determinations; generate the preliminary voxel map or the preliminary heatmap based on the preliminary determinations; modify the sensor data to include digital data that describes the preliminary voxel map or the preliminary heatmap; and transmit the wireless message that includes the sensor data to the remote vehicles 124. The sensor systems 199 of each of the remote vehicles 124 also share sensor data with the vehicle 123 that also includes sensor data that describes a preliminary voxel map or a preliminary heatmap that these remote vehicles 124 have generated using the sensor data that these remote vehicles 124 have themselves recorded.

In some embodiments, the preliminary heatmaps or the preliminary voxel maps are the output of a deep learning algorithm included in the sensor module 204 or the communication module 202; the deep learning algorithm analyzes the camera images included in the sensor data recorded by the sensor set 295 of the vehicle 123 itself to generate the preliminary heatmaps or the preliminary voxel maps. In some embodiments, the preliminary heatmaps or the preliminary voxel maps include bounding boxes around each of the objects detected by the sensor set 295 in the roadway environment that includes the vehicle 123.

In some embodiments, a voxel map (e.g., a preliminary voxel map) is a general term, and a heatmap (e.g., a preliminary heatmap) as used herein is a specific type of voxel map when applied to a 3D space. The voxel maps or heatmaps described below for the fusion module 206 are different than the preliminary voxel map and the preliminary heatmap described here for the communication module 202 because, for example, the preliminary voxel map and the preliminary heatmaps are based on the sensor data for one viewpoint (e.g., one vehicle 123) whereas the non-preliminary versions of these maps are based on the sensor data for multiple viewpoints (e.g., the sensor data recorded by multiple vehicles 123, 124 whose sensors perceive the same scene).

The fusion module 206 can be software including routines for executing one or more of the following steps: causing the communication module 202 to retrieve the sensor data set from the memory 227; and analyzing the sensor data set including the sensor data from the vehicle 123 and the remote vehicles 124 to generate a combined heatmap based on the sensor data set. In some embodiments, the sensor data set includes, among other things, a set of preliminary heatmaps that was recorded by both the vehicle 123 itself and the remote vehicles 124. In some embodiments, a preliminary heatmap which is generated by a particular vehicle 123, 124 is an output of a deep learning algorithm after processing camera images included in the sensor data for this particular vehicle 123, 124. The combined heatmap is described by combined heatmap data that is stored in the memory 227.

In some embodiments, the fusion module 206 includes a fusion algorithm.

Figure 10:
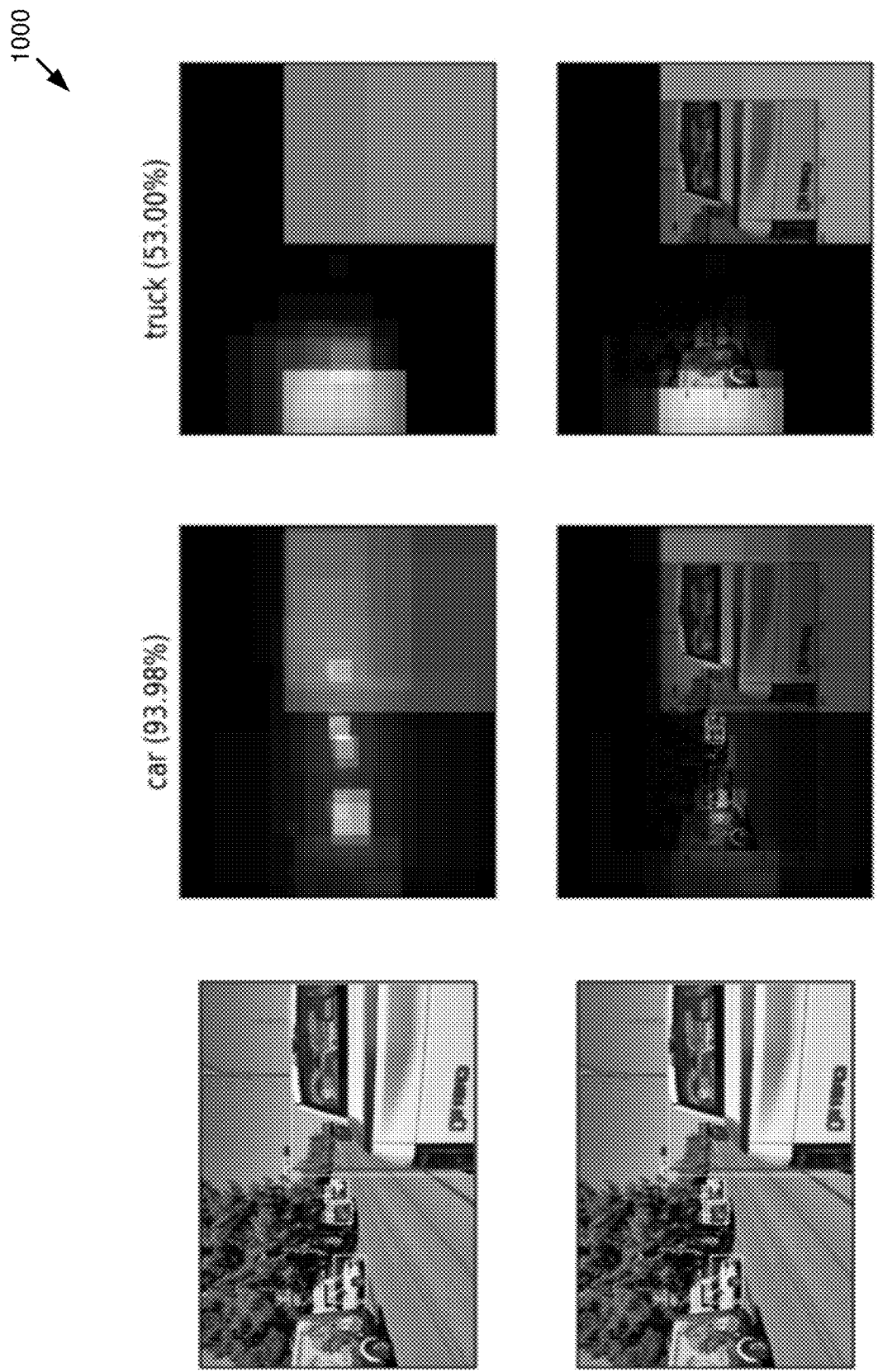
FIG. 10 is a diagram illustrating an example combined heatmap according to some embodiments.

In some embodiments, the fusion module 206 causes the communication module 202 to retrieve the sensor data set from the memory 227. The fusion module 206 includes code and routines that, when executed by the processor 225 of the vehicle 123, causes the processor 225 to execute one or more of the following steps using the sensor data set as an input for the fusion module 206 [including, optionally, the set of preliminary heatmaps]: (1) construct a 2D heatmap of objects whose presence in the roadway environment of the vehicle 123 is indicated by the sensor data included in the sensor data set [this is an example of a preliminary heatmap]; (2) construct bounding boxes around each of the objects included in the preliminary heatmap [in some embodiments, each bounding box includes exactly one object; the bounding boxes may be the output of a deep learning algorithm after processing camera images included in the sensor data]; (3) estimate, for each bounding box, a class for the object included in the bounding box [example classes include car, road, bicycle and pedestrian]; (4) estimate, for each bounding box, a confidence value for the class assigned to each object; (5) fuse data with each bounding box that describes the position of the object included therein, the velocity of the object included therein, the heading of each object included therein, the class of the object included therein and the confidence value of the class; and (6) generate a combined heatmap that visually depicts each object and the confidence that the class assigned to each object in step (4) is correct. In this example way, the fusion module 206 outputs combined heatmap data describing a combined heatmap using the sensor data set as an input. The fusion module 206 thusly transforms the sensor data set into combined heatmap data according to some embodiments. An example of a combined heatmap generated by the fusion module 206 and the process described in this paragraph is depicted in FIG. 10. As depicted in FIG. 10, darker colors in the combined heatmap represent lower confidence. A combined heatmap is an example of a preliminary heatmap according to some embodiments. In other embodiments, a combined heatmap is not an example of a preliminary heatmap. The steps described in this paragraph are only included as examples. Other steps or fewer steps are possible according to some embodiments.

In some embodiments, the fusion module 206 can be stored in the memory 227 of the computer system 200 and can be accessible and executable by the processor 225. The fusion module 206 is adapted for cooperation and communication with the processor 225 and other components of the computer system 200 via signal line 226.

The localization module 208 can be software including routines for (1) determining the exact position of each of the significant objects that are within the roadway environment and (2) determining a most likely classification for each object.

In some embodiments, an object is significant, for example, if it is an object that a vehicle 123 that includes the computer system 200 may collide with or if colliding with the object would result in an injury or loss of life for a human or some other animal. In some embodiments, an object is significant if the object is one which has a classification which is assignable by the fusion module 206 (i.e., a vehicle, a road, a bicycle, or a pedestrian).

A voxel is a 3D pixel. A 3D space, such as the roadway environment where the vehicle 123 and the remote vehicles 124 are located, is dividable into a plurality of voxels stacked onto and beside one another. According to this construct, each of the bounding boxes as determined by the fusion module 206, as well as the objects they include, is located inside different voxels. The localization module 208 includes code and routines that are operable, when executed by the processor 225, to cause the processor 225 to assign voxels to the 3D space (i.e., the roadway environment) and analyze the bounding boxes and the other available digital data (e.g., the sensor data set) to determine, for each bounding box, which voxel (or set of voxels) it is located within. In this way, the localization module 208 is operable to (1) determine the exact position of each of the significant objects that are within the roadway environment and (2) determine the most likely classification for each significant object.

In some moments, the localization module 208 includes code and routines that are operable, when executed by the processor 225, to cause the processor 225 to modify the combined heatmap data that is outputted by the fusion module 206 based on the analysis provided by the localization module 208. For example, the localization module 208 modifies the combined heatmap data so that the combined heatmap data describes, for each significant object, (1) the exact position of the significant object in 3D space and (2) the most likely classification for each significant object.

In some moments, the localization module 208 includes code and routines that are operable, when executed by the processor 225, to cause the processor 225 to provide the combined heatmap data to the communication module, build a wireless message that includes the combined heatmap data, and control the operation of the communication unit 245 to cause the communication unit 245 to broadcast or unicast the wireless message including the combined heatmap data to one or more remote vehicles 124.

Figure 4:
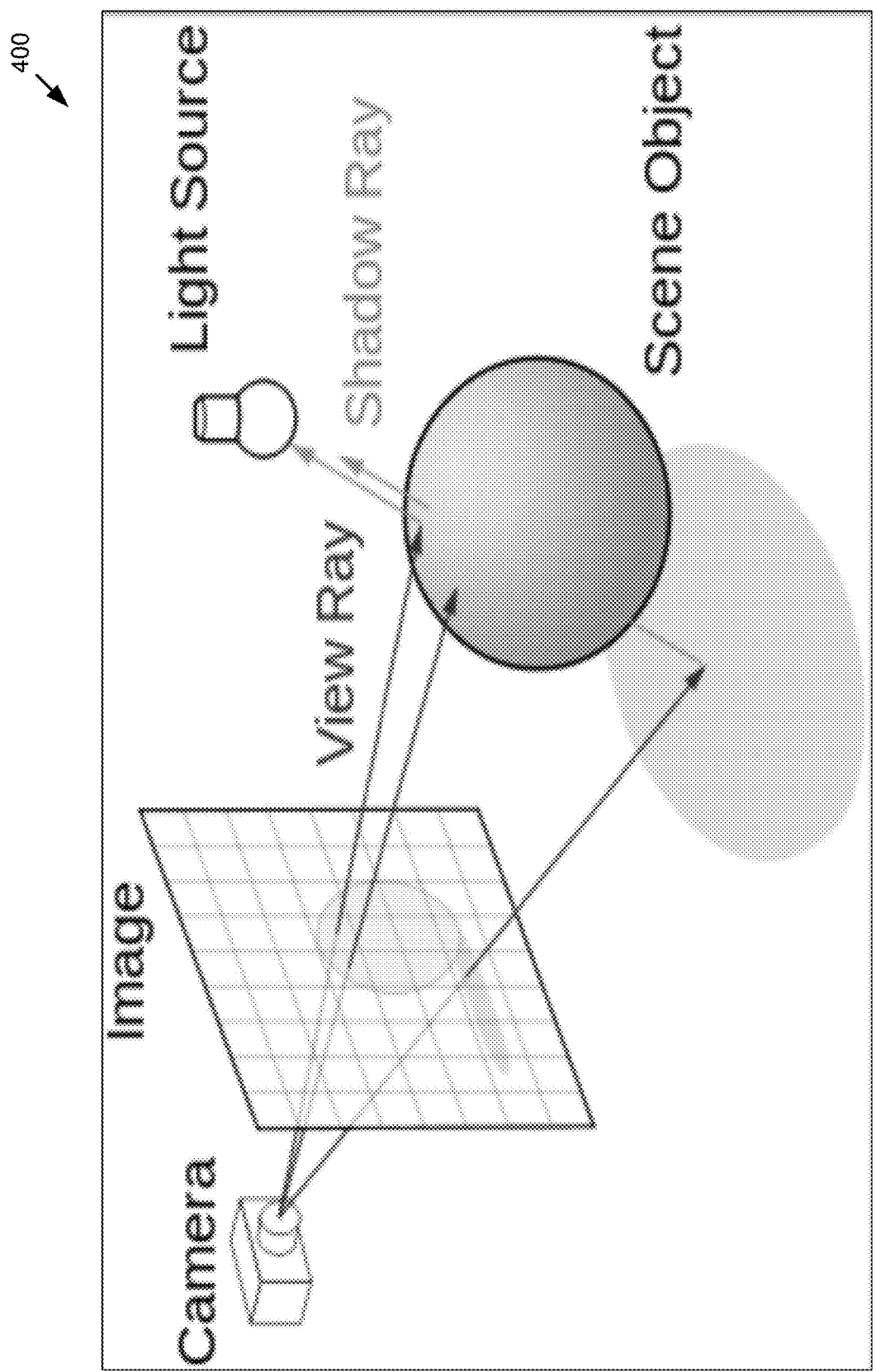
FIG. 4 is a diagram illustrating ray casting terminology according to some embodiments.

In some embodiments, the localization module 208 can be stored in the memory 227 of the computer system 200 and can be accessible and executable by the processor 225. The localization module 208 is adapted for cooperation and communication with the processor 225 and other components of the computer system 200 via signal line 228. FIG. 4 depicts different examples of ray casting terminology that is useful for understanding the operation of the localization module 208 according to some embodiments.

In some embodiments, the sensor system 199 includes code and routines that are operable, when executed by the processor 225, to cause the processor 225 to execute one or more of the following steps: receiving, from a set of remote vehicles, a sensor data set describing a set of preliminary heatmaps for a roadway environment, wherein the heatmaps included in the set of preliminary heatmaps describes the objects in the roadway environment as observed by the onboard sensors of individual remote vehicles 124 included in the set of remote vehicles; reconciling discrepancies in the set of heatmaps and a preliminary heatmap of an ego vehicle 123 to form a combined heatmap that describes the objects in the roadway environment as collectively observed by the onboard sensors of the set of remote vehicles and the ego vehicle 123; and providing the combined heatmap to one or more of the remote vehicles 124 included in the set of remote vehicles. In some embodiments, the remote vehicles 124A ... 124N depicted in FIG. 1E form the set of remote vehicles.

In some embodiments, a preliminary heatmap is a 2D electronic map. In some embodiments, the preliminary heatmap includes a bounding box around each object identified in the roadway environment. In some embodiments, the preliminary heatmap describes one or more of the following: a preliminary estimate of a position of the objects within the environment; a preliminary classification for each object; and a preliminary confidence value that the preliminary classification is correct. In some embodiments, the combined heatmap is a 3D electronic map. In some embodiments, the combined heatmap removes one or more of the following that are present in the preliminary heatmap for an individual remote vehicle 124: an occlusion; a missed detection of an object; and an uncertain detection of an object. In some embodiments, the ego vehicle 123 is an autonomous vehicle. In some embodiments, the ego vehicle 123 is not an autonomous vehicle. In some embodiments, the ego vehicle 123 is an HAV. In some embodiments, the ego vehicle 123 is not an HAV.

Referring now to FIG. 3, depicted is a flowchart of an example method 300 for sharing combined heatmap data among one or more automated vehicles according to some embodiments. One or more of the steps described herein for the method 300 may be executed by one or more computer systems 200. The steps of the method 300 may be executed in any order, and not necessarily the order depicted in FIG. 3. In some embodiments, one or more of the steps of the method 300 depicted in FIG. 3 are optional.

At step 303, each of the ego vehicle and the remote vehicles collects their own sensor measurements.

At step 305, each of the ego vehicle and the remote vehicles determines their own preliminary heatmaps for each scene based on their own sensor measurements. These preliminary heatmaps are then included in their sensor data along with their sensor measurements. The preliminary heatmaps are 2D maps and not 3D maps.

At step 307, each of the ego vehicle and the remote vehicles broadcasts their sensor data.

At step 308, the sensor system of the ego vehicle receives sensor data from a plurality of remote vehicles and builds the senor data set.

At step 309, the sensor system of the ego vehicle reconciles the heatmaps of the remote vehicles and the ego vehicle to form a combined heatmap. The combined heatmap is a 3D map built by the sensor system based at least in part on the 2D maps included in the sensor data set as recorded by ego vehicle and the remote vehicles. The combined heatmap describes the location and classification for each object in the roadway environment that includes the ego vehicle and the remote vehicles, absent deficiencies caused by occlusions, misidentified objects, and unidentified objects.

In some embodiments, step 309 includes an optional sub-step 310. At sub-step 310, the preliminary heatmaps are first projected into 3D voxel space. If the projection from two 2D heatmaps intersect at one voxel, this means the particular voxel in the 3D space generates a value at these two 2D heatmaps. In other words, two vehicles from two different viewpoints "see" the same object with different confidence (the values on the heatmaps represent the confidence values). Therefore, the preliminary heatmaps 2D maps. But when fusing the heatmaps from different viewpoints, they are combined to form a 3D map.

At step 312, the sensor system of the ego vehicle broadcasts digital data describing the combined heatmap to the remote vehicles so that they have access to the combined heatmap. This digital data includes, for example, the combined heatmap data.

Referring now to FIG. 4, depicted a block diagram 400 illustrating ray casting terminology according to some embodiments. The block diagram 400 depicts terminology which is used in the description of the localization module 208. The sphere depicted in FIG. 4 is an "object" or "scene object."

In some embodiments, each of the remote vehicles 124 and the vehicle has a different viewpoint for the roadway environment and observe objects in a "scene." A scene is a moment in time that is described by the sensor data of multiple vehicles selected from the set that includes the remote vehicles 124 and the vehicle 123. Physically, real objects in the scene interact with rays of light to generate images of the objects onto several image planes of observation corresponding to each viewpoint (e.g., each vehicle).

In some embodiments, as described above, the localization module 208 assumes that the 3D space of the roadway environment is divided into voxels. The localization module 208 includes code and routines that are operable, when executed by the processor 225, to calculate, for each image on the image plane, which voxels are responsible for producing the image on the image plane. The solution to this calculation is a cone shape, or a frustum shape if constraints on where an object may be placed are assumed. An example of this is depicted in FIG. 5.

Figure 5:
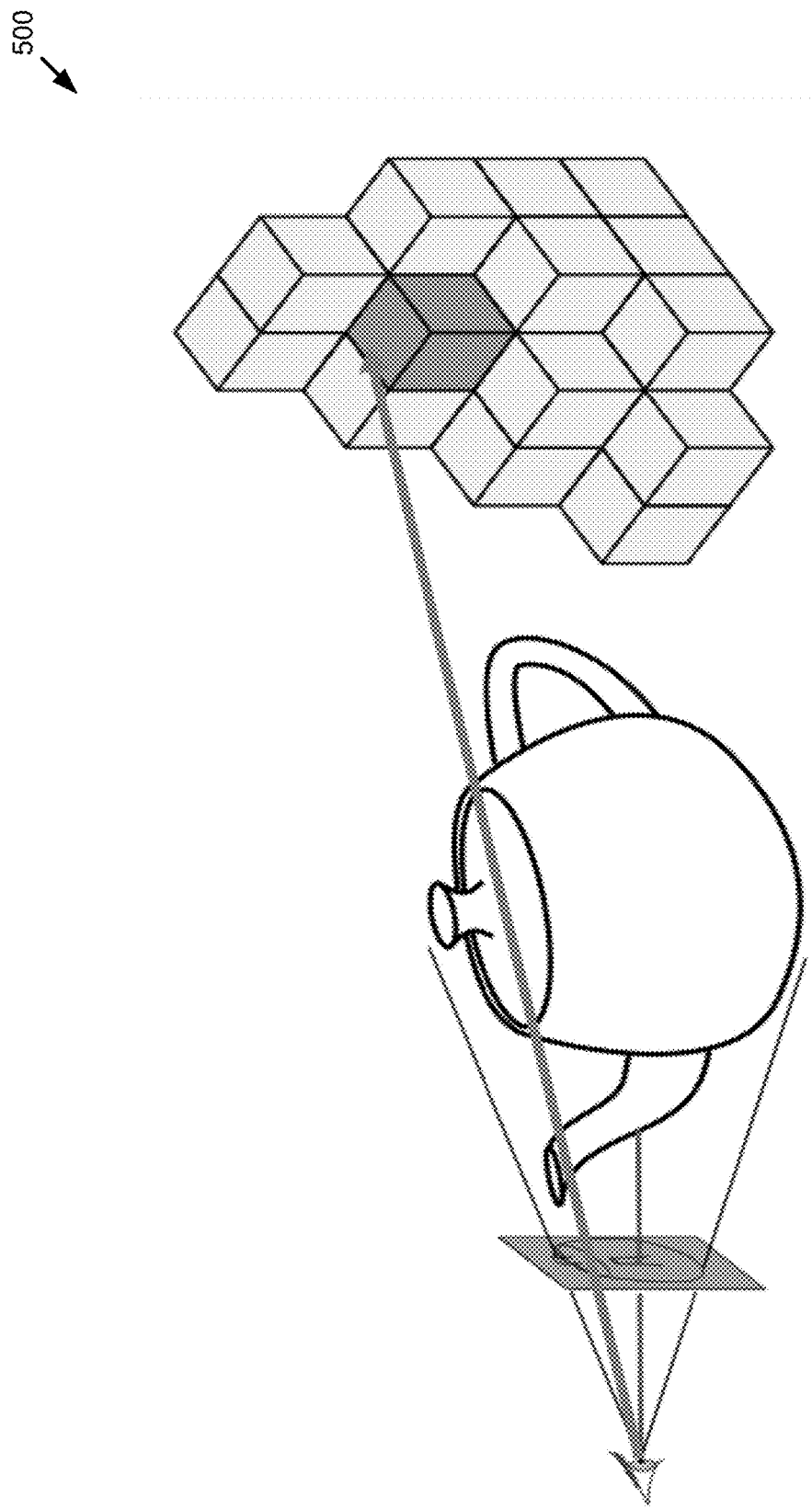
FIG. 5 is a diagram illustrating an example embodiment of determining a position of an object in three-dimensional (3D) space using ray casting according to some embodiments.

Referring now to FIG. 5, depicted is a block diagram 500 illustrating an example embodiment of determining a position of an object in 3D space using ray casting according to some embodiments.

The calculation by the localization module 208 and the fusion module 206 of which voxels are responsible for producing the image on the image plane is now described according to some embodiments. The first remote vehicle 124A depicted in FIG. 1E is referred to in this description as V1. The second remote vehicle 124B depicted in FIG. 1E is referred to in this description as V2. The third remote vehicle 124C depicted in FIG. 1E is referred to in this description as V3.

In some embodiments, the localization module 208 includes code and routines that are operable, when executed by the processor 225, to cause the processor 225 to (1) casts rays through each voxel in 3D space and (2) color the voxel with the color of the pixel from the preliminary heatmap that corresponds to the ray that passes through the image plane into voxel space. An example of this is depicted in FIG. 5 according to some embodiments. Each viewpoint (e.g., each vehicle V1, V2 and V3) produces a set of colored voxels (e.g., the preliminary heatmaps which V1, V2 and V3 include in their sensor data which is provided to the ego vehicle 123), and the fusion module 206 aggregates the measurements from multiple viewpoints when it provides its functionality. This is an example of how the preliminary heatmaps are generated and provided via the sensor data that is shared by the communication module 202.

In some embodiments, the localization module 208 has access to the preliminary heatmap of each viewpoint (e.g., V1, V2 and V3) because this information is included in the sensor data that is shared by the various viewpoints. The localization module 208 analyzes the preliminary heatmaps received from each viewpoint and reconciles them against one another.

This reconciliation is now described according to some embodiments. Recall that each heatmap image represents a probability distribution over the likely class of each voxel in the heatmap. In some embodiments, the constraint on each voxel along the class dimension is that the probability must sum to one. In some embodiments, the localization module 208 includes code and routines that includes a probability distribution governed by the following function:

$$\sigma(z)_j = \frac{e^{z_j}}{\sum_{k=1}^{K} e^{z_k}}$$

To reconcile the heatmaps, the localization module 208 adds them together elementwise (or class-wise) and normalizes them using the function depicted above. In this way a combined heatmap is generated based on a plurality of preliminary heatmaps as determined by multiple viewpoints. Digital data describing this combined heatmap is then provided to the other viewpoints via wireless communication. This combined heatmap is inherently better than a preliminary heatmap because, for example, it removes occlusions, missed detections of objects and uncertain detections of objects.

Figure 6:
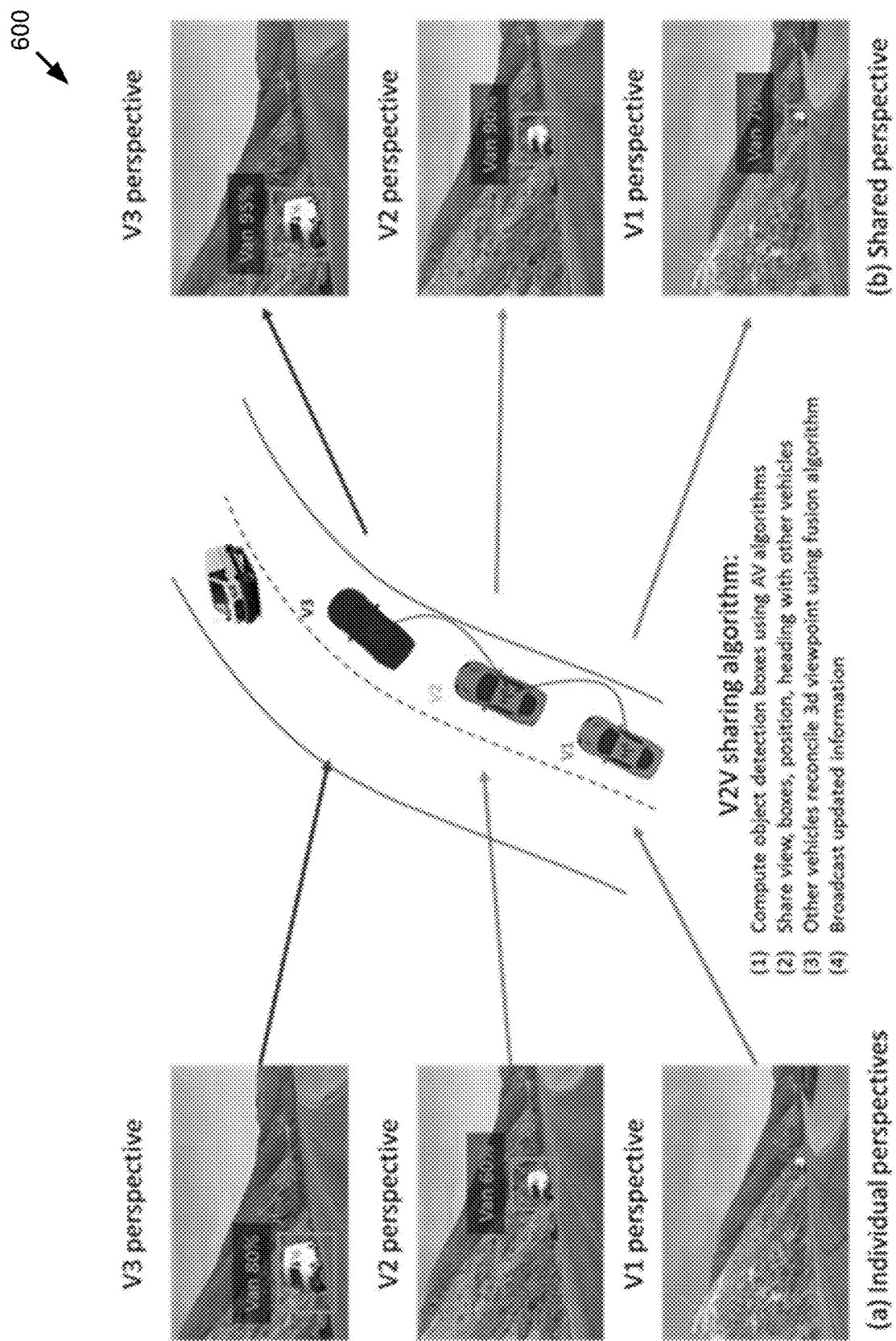
FIG. 6 is a diagram illustrating an example operating environment including the sensor system according to some embodiments.

Referring now to FIG. 6, depicted is a block diagram illustrating an example operating environment 600 including the sensor system according to some embodiments. The first remote vehicle 124A depicted in FIG. 1E is referred to in this description as V1. The second remote vehicle 124B depicted in FIG. 1E is referred to in this description as V2. The third remote vehicle 124C depicted in FIG. 1E is referred to in this description as V3.

Figure 9:
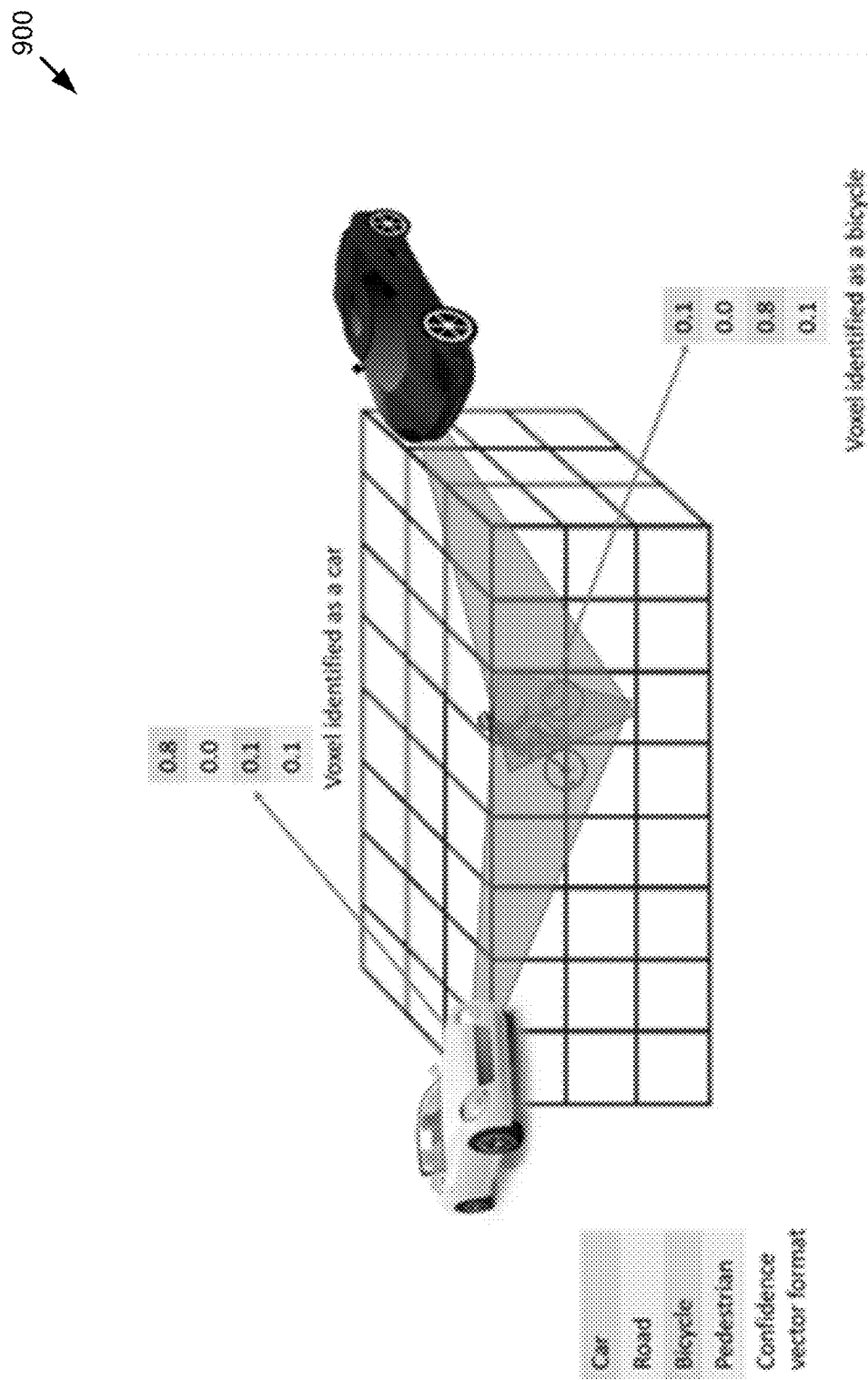
FIG. 9 is a diagram illustrating an example operation of a localization module according to some embodiments.

As depicted in FIG. 9, one or more of the vehicles (V1, V2 and V3) include a sensor system. In some embodiments, the sensor system estimates the positions of objects of interest. In some embodiments, the positions are estimated by the sensor system by considering each vehicle's position and heading along with the relative position occupied by the object of interest. In some embodiments, each detected object has a confidence value associated with it as the sensor system determines and reports the confidence value when detecting the object.

In some embodiments, vehicles share sensor data that describes one or more of the following: their position; their heading; and any sensor measurements they have recorded. In some embodiments, this sensor data is shared with other vehicles using wireless communication. This wireless communication may be broadcast or unicast. The sensor system receives this sensor data from the other vehicles and forms the sensor data set. The sensor system analyzes the sensor data and determines a set of objects and bounding boxes. The sensor system includes a fusion module 206. The fusion module 206 includes code and routines that are operable, when executed by the processor 225, to cause the processor 225 to generate the set of objects and the bounding boxes from the sensor data set. The fusion module 206 includes code and routines that are operable, when executed by the processor 225, to cause the processor 225 to analyze the set of objects and bounding boxes to determine likely positions of the detected subjects. Initially in the (a) portion of FIG. 6 (e.g., the left-hand side of FIG. 6), the van is not detected by the automated driving system of V1 and detected with low confidence by the automated driving system of vehicles V2 and V3. After the fusion module 206 is executed and the results of this execution are shared via wireless communication with the other vehicles, the (b) portion of FIG. 6 (e.g., the right-hand side of FIG. 6) shows how the sensor system of V1 is now able to identify the van from afar and vehicles V2 and V3 now have increased confidence in the detection of the van. Accordingly, FIG. 6 depicts an example of how the sensor system improves the operation of the automated driving system of V1.

Figure 7:
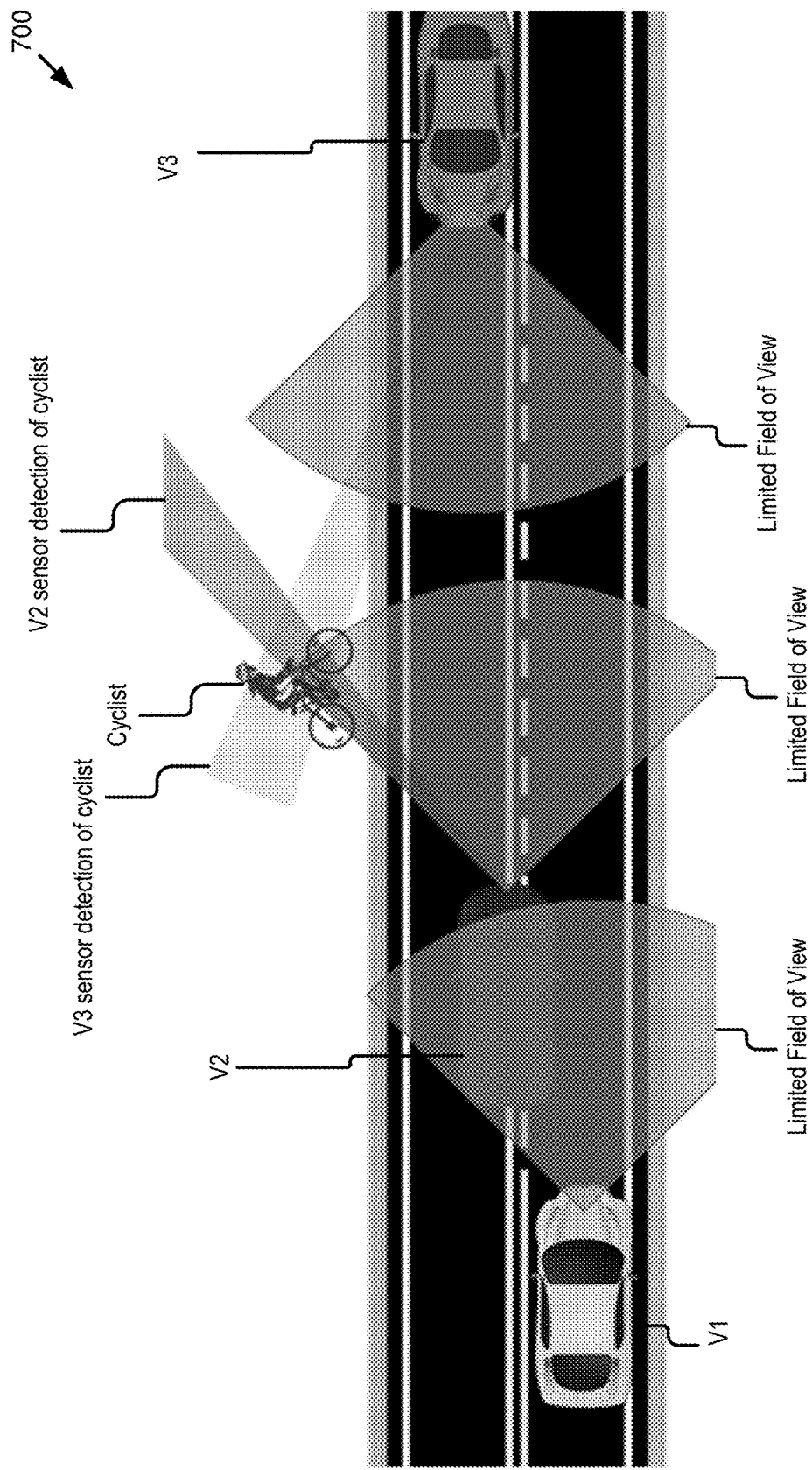
FIG. 7 is a diagram illustrating an example operation of a fusion module according to some embodiments.

Referring now to FIG. 7, depicted is a block diagram 700 illustrating an example operation of a fusion module 206 according to some embodiments. FIG. 7 illustrates how the fusion module 206 works from a bird's eye view according to some embodiments. Each vehicle has a limited field of vision depicted by the semicircles. The automated driving system is only able to detect objects that are not occluded and within a certain distance to the camera system. In this case, vehicles V2 and V3 are both able to see the cyclist on the side of the road as depicted by the sensor beams. However, the sensors of vehicle V1 are unable to see the cyclist due to occlusion from the vehicle V2. The sensor system solves for the intersection of the cone of visibility for each identified object to estimate positions. Some vehicular sensors such as LIDAR may be included in the sensor system and provide 3D information which is considered by the sensor system to simultaneously estimate the position of an object (e.g., another vehicle, the cyclist, or some other object) and a confidence value that this position estimate is accurate.

Figure 8:
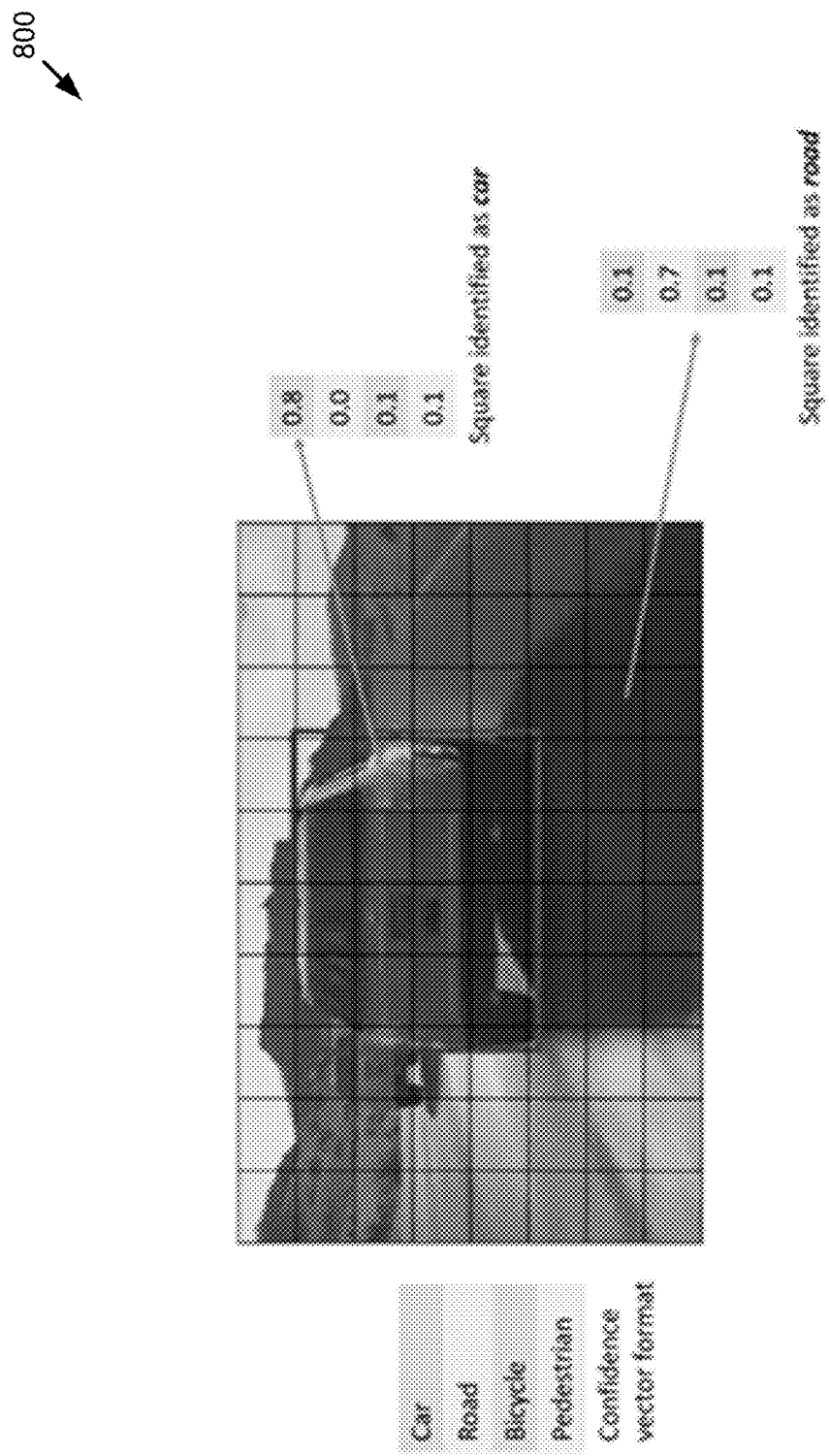
FIG. 8 is a diagram illustrating an example grid labeling scheme according to some embodiments.

Referring now to FIG. 8, depicted is a block diagram 800 illustrating an example grid labeling scheme according to some embodiments. In some embodiments, the localization module 208 utilizes the grid labeling scheme depicted in FIG. 8.

As depicted in FIG. 8, each grid square has a vector of predicted classes. In this example, there are four object classes: car; road; bicycle; and pedestrian. Each vector of values corresponding to a grid square represents the square's level of activation for that object type. The localization module 208 extends this approach to 3D space and cooperates with the fusion module 206 to reconcile multiple measurements according to some embodiments.

Referring to FIG. 9, depicted is a block diagram 900 illustrating an example operation of a localization module 208 according to some embodiments. As depicted in FIG. 9, the localization module 208 divides space into volumetric voxels and projects detected bounding boxes into the voxel space. The intersection of the voxels localizes the 3D bounding boxes of the detected objects. For sensors with existing 3D information such as LIDAR, the voxels are populated directly. To ascertain confidence values, in some embodiments the localization module 208 uses the following guidelines: (1) confidence values reported by the classifier of the localization module 208 are dependent on the model and algorithm (these values may vary naturally even when using the same model and a slightly different perspective); (2) when an object is visible to only one sensor, the global confidence is equal to or less than the single confidence value reported; (3) when two or more sensors detect an object and the two sensors agree on the object class, the confidence should increase; (4) when two or more sensors detect an object and they disagree on the object class, the confidence should decrease; and (5) confidence over all predicted classes must sum to 1.

In some embodiments, the localization module 208 includes a dataset that illustrate these cases in configurations such as occlusion and missed detection due to distance or perspective.

In some embodiments, the localization module 208 applies the concept of grid-square labeling of the scene from Error! Reference source not found.9. Each square is represented by a class vector that stores confidence values for that square. So, if there are four classes such as [car, road, bicycle, pedestrian], a square labeled as car may look like z=[0.8, 0.0, 0.1, 0.1], where only the maximal class is considered. For an ambiguous square, the vector may look like [0.25, 0.25, 0.25, 0.25] where no class clearly dominates. The localization module 208 calculates object detection confidence values using the following formula:

$$\sigma(z)_j = \frac{e^{z_j}}{\sum_k e^{z_k}},$$

where $z_j$ is the corresponding value in the label vector. In the first example, $$\sigma(z)_j = \frac{e^{0.8}}{e^{0.8} + e^0 + e^{0.1} + e^{0.1}} = 0.409,$$

this means that 0.8 actually corresponds to a confidence of 41%. Each voxel now has a vector of prediction values. To aggregate the prediction values, the localization module 208 adds the z vectors for each voxel and normalizes by the denominator term. Variants of this approach can weigh the z vectors by distance to subject, sensor quality, model quality and other factors. This approach conforms to guidelines 1-5 as described earlier.

Referring now to FIG. 10, depicted is a block diagram 1000 illustrating an example combined heatmap according to some embodiments. Images in the upper row represent degrees of confidence where brighter areas are more confident and darker areas are less. The bottom row shows a masked image of the original frame annotated with the heatmap. These masked images illustrate the attention of the object detector on certain areas of the image. The middle column shows heatmaps for the car class while the rightmost column shows heatmaps for the truck class.

In some embodiments, these heatmaps tend to be very confident in the center of an object, while dropping off near the edges. In some embodiments, the sensor system 199 leverages this additional information in later steps to help resolve uncertain detections. In some embodiments, the sensor system 199 assumes that object detectors perform reasonably well in the deployment environment for the objects of interest.

As depicted in FIG. 10, each heatmap image is a W×H×C matrix which represents width (W), height (H), and class (C), respectively. In some embodiments, class is encoded as a one-hot vector where the vector is strongest for the most likely class. In some embodiments, the classifier makes a prediction over the probability distribution over likely classes of a pixel.

In some embodiments, the sensor system 199 requires the following measurements: position, heading and camera data, where heading can be calculated from the change in position over time. Post-processing will annotate the camera data with bounding boxes for each object detected (e.g. vehicle or pedestrian). This information will then be fused to estimate the position of the subjects.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory.

These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method implemented by an ego vehicle, the method comprising:
   receiving, from a set of remote vehicles, a set of sensor data describing a set of preliminary heatmaps for a roadway environment, wherein the preliminary heatmaps included in the set of preliminary heatmaps describe objects in the roadway environment as observed by onboard sensors of individual remote vehicles included in the set of remote vehicles and preliminary confidence values that preliminary classifications of the objects are correct;

reconciling viewpoints in the set of preliminary heatmaps and a preliminary heatmap of the ego vehicle to form a combined heatmap that describes an estimated confidence value for an object class associated with each corresponding object in the roadway environment as collectively observed by the onboard sensors of the set of remote vehicles and the ego vehicle, wherein the estimated confidence value in the object class is higher when two or more sensors agree on a preliminary classification and wherein the estimated confidence value for the object class is lower when the two or more sensors disagree on the preliminary classification;

providing, by the ego vehicle, the combined heatmap directly to one or more of the remote vehicles included in the set of remote vehicles, wherein the combined heatmap includes a grid of squares and each square is associated with a class vector that stores estimated confidence values for object classes associated with corresponding objects in the roadway environment and wherein the object class with a greatest confidence value is considered; and modifying an operation of the ego vehicle based on the combined heatmap.

2. The method of claim 1, wherein the object class include car, road, bicycle, and pedestrian.

3. The method of claim 1, wherein the preliminary heatmap is a two-dimensional electronic map that includes a bounding box around each object identified in the roadway environment and each bounding box describes a position of the object included therein, a velocity of the object included therein, and the estimated confidence value and the object class included therein.

4. The method of claim 1, wherein the preliminary heatmap describes a preliminary estimate of a position of the objects within the roadway environment.

5. The method of claim 1, wherein the preliminary heatmaps each represent a probability distribution over a likely class of each voxel in the preliminary heatmaps and the combined heatmap is a voxel map that is applied to a three-dimensional space.

6. The method of claim 1, wherein the combined heatmap removes one or more of the following that are present in the preliminary heatmap for an individual remote vehicle: an occlusion; a missed detection of an object; and an uncertain detection of an object.

7. The method of claim 1, wherein the viewpoints in the set of preliminary heatmaps and the preliminary heatmap are reconciled by being added together based on the object class and normalized.

8. The method of claim 1, wherein the ego vehicle is a highly autonomous vehicle.

9. A system of an ego vehicle comprising:

a processor that is communicatively coupled to a non-transitory memory, wherein the non-transitory memory stores computer code which, when executed by the processor, causes the processor to:

receive, from a set of remote vehicles, a set of sensor data describing a set of preliminary heatmaps for a roadway environment, wherein the preliminary heatmaps included in the set of preliminary heatmaps describe objects in the roadway environment as observed by onboard sensors of individual remote vehicles included in the set of remote vehicles and preliminary confidence values that preliminary classifications of the objects are correct;

reconcile discrepancies in the set of preliminary heatmaps and a preliminary heatmap of the ego vehicle to form a combined heatmap that describes an estimated confidence value for an object class associated with each corresponding object in the roadway environment as collectively observed by the onboard sensors of the set of remote vehicles and the ego vehicle, wherein the estimated confidence value in the object class is higher when two or more sensors agree on a preliminary classification and wherein the estimated confidence value for the object class is lower when the two or more sensors disagree on the preliminary classification;

provide, by the ego vehicle, the combined heatmap directly to one or more of the remote vehicles included in the set of remote vehicles wherein the combined heatmap includes a grid of squares and each square is associated with a class vector that stores estimated confidence values for object classes associated with corresponding objects in the roadway environment and wherein the object class with a greatest confidence value is considered; and modify an operation of the ego vehicle based on the combined heatmap.

10. The system of claim 9, wherein the object class include car, road, bicycle, and pedestrian.

11. The system of claim 9, wherein the preliminary heatmap is a two-dimensional electronic map that includes a bounding box around each object identified in the roadway environment and each bounding box describes a position of the object included therein, a velocity of the object included therein, and the estimated confidence value and the object class included therein.

12. The system of claim 9, wherein the preliminary heatmap describes a preliminary estimate of a position of the objects within the roadway environment.

13. The system of claim 9, wherein the preliminary heatmaps each represent a probability distribution over a likely class of each voxel in the preliminary heatmaps and the combined heatmap is a voxel map that is applied to a three-dimensional space.

14. The system of claim 9, wherein the combined heatmap removes one or more of the following that are present in the preliminary heatmap for an individual remote vehicle: an occlusion; a missed detection of an object; and an uncertain detection of an object.

15. The system of claim 9, wherein the discrepancies in the set of preliminary heatmaps and the preliminary heatmap are reconciled by being added together based on the object class and normalized.

16. The system of claim 9, wherein the ego vehicle is a highly autonomous vehicle.

17. A computer program product of an ego vehicle comprising a non-transitory memory storing computer-executable code that, when executed by a processor, causes the processor to:

receive, from a set of remote vehicles, a set of sensor data describing a set of preliminary heatmaps for a roadway environment, wherein the preliminary heatmaps included in the set of preliminary heatmaps describe objects in the roadway environment as observed by onboard sensors of individual remote vehicles included in the set of remote vehicles and preliminary confidence values that preliminary classifications of the objects are correct;

reconcile discrepancies in the set of preliminary heatmaps and a preliminary heatmap of the ego vehicle to form a combined heatmap that describes an estimated confidence value for an object class associated with each corresponding object in the roadway environment as collectively observed by the onboard sensors of the set of remote vehicles and the ego vehicle, wherein the estimated confidence value in the object class is higher when two or more sensors agree on a preliminary classification and wherein the estimated confidence value for the object class is lower when the two or more sensors disagree on the preliminary classification;

provide the combined heatmap directly to one or more of the remote vehicles included in the set of remote vehicles, wherein the combined heatmap includes a grid of squares and each square is associated with a class vector that stores estimated confidence values for object classes associated with corresponding objects in the roadway environment and wherein the object class with a greatest confidence value is considered; and modify an operation of the ego vehicle based on the combined heatmap.

18. The computer program product of claim 17, wherein the object class include car, road, bicycle, and pedestrian.

19. The computer program product of claim 18, wherein the preliminary heatmap includes a bounding box around each object identified in the roadway environment and each bounding box describes a position of the object included therein, a velocity of the object included therein, and the estimated confidence value and the object class included therein.

20. The computer program product of claim 17, wherein the preliminary heatmap describes a preliminary estimate of a position of the objects within the roadway environment.

* * * * *